US010622919B2

(12) United States Patent
Park et al.

(10) Patent No.: US 10,622,919 B2
(45) Date of Patent: Apr. 14, 2020

(54) NANO-POROUS THIN FILM, METHODS OF FABRICATING THEREOF AND TRIBOELECTRIC GENERATOR USING THE SAME

(71) Applicant: UNIVERSITY-INDUSTRY FOUNDATION (UIF), YONSEI UNIVERSITY, Seoul (KR)

(72) Inventors: Cheolmin Park, Seoul (KR); Chanho Park, Gyeonggi-do (KR); Giyoung Song, Chungcheongnam-do (KR); Sun Man Cho, Gyeonggi-do (KR)

(73) Assignee: UNIVERSITY-INDUSTRY FOUNDATION (UIF), YONSEI UNIVERSITY, Seoul (KR)

( * ) Notice: Subject to any disclaimer, the term of this patent is extended or adjusted under 35 U.S.C. 154(b) by 154 days.

(21) Appl. No.: 15/862,800

(22) Filed: Jan. 5, 2018

(65) Prior Publication Data

US 2018/0294745 A1 Oct. 11, 2018

(30) Foreign Application Priority Data

Apr. 11, 2017 (KR) .......................... 10-2017-0046805

(51) Int. Cl.
*H02N 1/04* (2006.01)
*C08L 39/08* (2006.01)
*C08L 53/00* (2006.01)

(52) U.S. Cl.
CPC ............... *H02N 1/04* (2013.01); *C08L 39/08* (2013.01); *C08L 53/00* (2013.01); *C08L 2203/16* (2013.01); *C08L 2205/18* (2013.01); *C08L 2207/53* (2013.01)

(58) Field of Classification Search
CPC . H02N 1/04; C08L 53/00; C08L 39/08; C08L 2205/18; C08L 2203/16; C08L 2207/53
USPC .................................................. 310/300, 309
See application file for complete search history.

(56) References Cited

U.S. PATENT DOCUMENTS

| 2003/0152759 | A1* | 8/2003 | Chao | ................... | B01J 29/0308 428/307.3 |
| 2017/0355860 | A1* | 12/2017 | Park | ...................... | C09D 5/006 |
| 2017/0359001 | A1* | 12/2017 | Wang | ...................... | H02N 1/04 |

OTHER PUBLICATIONS

Office Action dated Oct. 5, 2018 corresponding to Korean Patent Application No. 10-2017-0046805, 5 pages.
(Continued)

*Primary Examiner* — Thomas Truong

(57) ABSTRACT

The present invention relates to a nano-porous thin film comprising a supramolecular structure having a skeleton, a first compound block and a second compound block including a functional group is self-assembled to form a spherical micelle, the first compound block constitutes a core of the spherical micelle, and the second compound block constitutes a shell of the spherical micelle, the first compound block is removed from the spherical micelle while the second compound is remaining so that the remaining second compound provide the skeleton of the supramolecular structure, the supramolecular structure comprises pores formed therein, and metal ions selectively bonded to the functional group.

17 Claims, 13 Drawing Sheets

(56) References Cited

OTHER PUBLICATIONS

Nandan et al., Supramolecular assemblies of block copolymers as templates for fabrication of nanomaterials, European Polymer Journal, vol. 47, pp. 584-599 (2011).

Jeong et al., Topographically-Designed Triboelectric Nanogenerator via Block Copolymer Self-Assembly, Nano Letters, vol. 14, pp. 7031-7038 (2014).

* cited by examiner

NANO-POROUS THIN FILM, METHODS OF FABRICATING THEREOF AND TRIBOELECTRIC GENERATOR USING THE SAME

CROSS-REFERENCE TO RELATED APPLICATION

This application claims priority of Korean Patent Application No. 10-2017-0046805, filed on Apr. 11, 2017, in the KIPO (Korean Intellectual Property Office), the disclosure of which is incorporated herein entirely by reference.

BACKGROUND OF THE INVENTION

Field of the Invention

The present invention relates to energy harvesting technology, and more particularly, to a nano-porous thin film, a method of fabricating the same, and a triboelectric generator using the same.

Description of the Related Art

Recently, energy problems such as depletion of fossil energy, environmental pollution and increasing energy demand are emerging, and it is required to develop alternative energy that is different from an existing energy generation system. As a result, there is a growing interest in energy harvesting technology that transforms abandoned energy around us into usable electrical energy as an alternative energy technology. Based on the principle of inducing static electricity through friction among the energy harvesting techniques, there are various researches on devices that convert a kinetic energy into an electric energy.

Recently, as a technique of inducing static electricity through friction, it has been proposed to improve a short-circuit current density and a power efficiency of triboelectric generators by introducing features such as three-dimensional (3D) micro-nano structure, nanowire structure, or nanoparticle on a contact surface of the triboelectric generator There are technologies. However, since the contact surface is sensitive in the triboelectric generator, the contact surface of the triboelectric generator may be degraded in characteristics as the number of times of contact or the number of times of friction increases, thereby the short circuit current density and power efficiency may be reduced.

Therefore, the ability of the contact surface of the triboelectric generator to return to a previous state after being changed to any physical-chemical state (hereinafter referred to as 'reversibility') and to easily control the characteristics of the contact surface of the triboelectric generator may be required.

Further, a method of controlling the characteristics of the triboelectric generator using a surface treatment of the friction surface of the triboelectric generator, that is, through a process using formation of a structure and a process of forming a functional group on the surface, the development of a generator element has progressed in such a way as to make the reactivity with irons of a surface of the generator. However, the fabrication of such a generator device may cause problems such as addition and complexity in the process of forming the functional group on the surface.

SUMMARY OF THE INVENTION

Accordingly, it is an object of the present invention to provide a nano-porous thin film that is reversible, easily changes in contact surface characteristics, and is simple to manufacture.

Another aspect of the present invention is to provide a method of manufacturing a nano-porous thin film having the above-described advantages.

Another object of the present invention is to provide a triboelectric generator using the nano-porous thin film having the above-described advantages.

Additional aspects will be set forth in part in the description which follows and, in part, will be apparent from the description, or may be learned by practice of the presented embodiments.

In an example a nano-porous thin film comprising a supramolecular structure having a skeleton, a first compound block and a second compound block including a functional group is self-assembled to form a spherical micelle, the first compound block constitutes a core of the spherical micelle, and the second compound block constitutes a shell of the spherical micelle, the first compound block is removed from the spherical micelle while the second compound is remaining so that the remaining second compound provide the skeleton of the supramolecular structure, the supramolecular structure comprises pores formed therein, and metal ions selectively bonded to the functional group. The metal ions are selectively bonded to the functional group of the supramolecular structure, mainly disposed on the surface of the nano-porous thin film. The metal ions are ion-exchangeable with at least one other kind of ion. The metal ions comprise one of a monovalent cation, a divalent cation, and a trivalent cation. The monovalent cation includes at least one metal ion selected from lithium ion ($Li^+$), sodium ion ($Na^+$), potassium ion ($K^+$), rubidium ion ($Rb^+$), cesium ion ($Cs^+$) and franc ion ($Fr^+$), the divalent cation includes one kind of metal ion includes at least one metal ion selected from beryllium ion ($Be^{2+}$), magnesium ion ($Mg^{2+}$), calcium ion ($Ca^{2+}$), strontium ion ($Sr^{2+}$), barium ion ($Ba^{2+}$) and radium ion ($Ra^{2+}$), and the trivalent cations include at least one metal ion includes at least one metal ion selected from aluminum ions ($Al^{3+}$) and iron ions (III) ($Fe^{3+}$). The functional group comprises an anionic functional group, the anionic functional group includes at least one of a sulfonate group, a sulfonic acid group, a phosphate group, a sulfate group and a hydroxyl group. The first compound block includes at least one of poly-2-vinylpyridine (P2VP), pyrimidine, 2-methylpyrimidine, 4-methylpyrimidine, 5-methylpyrimidine, 4,6-dimethylpyrimidine, 4,6-dimethoxypyrimidine, 2-ethylpyrimidine, 4-ethylpyrimidine, 5-ethylpyrimidine, 4,6-diethylpyrimidine, 2-methoxypyrimidine, 4-methoxypyrimidine, 5-methoxypyrimidine, 2-ethoxypyrimidine, 4-ethoxypyrimidine, 5-ethoxypyrimidine, polyamic acid and polyolefin ketone. The second compound block includes at least one of syndiotactic polystyrene, polystyrene, sulfuronite polystyrene and sulfuronite silsesquioxane. A diameter of the supramolecular structure is controlled according to a concentration of the second compound block. A diameter of the pores formed in the supramolecular structure is controlled according to a mixing ratio of the second compound block to the first compound block. The first compound block comprises a heterocyclic compound having a cyclic structure, and the spherical micelle is formed through a hydrogen bond between an element in the heterocyclic compound having the cyclic structure of the first compound block and the functional group of the second compound block.

In an example, a method of fabricating of a nano-porous thin film comprising: preparing a first compound block and a second compound block comprising a functional group; mixing the first compound block and the second compound block to form a self-assembled spherical micelle in which the first compound block constitutes a core of the spherical micelle and the second compound block constitutes a shell of the spherical micelle; forming a supramolecular structure having a skeleton formed by a residual second compound block, by removing the first compound block from the spherical micelle by applying an etching solvent to the spherical micelle; and binding metal ions to pores formed in the supramolecular structure and the functional group, selectively. The method may further include ion-exchanging the metal ions bound to the functional group with at least one other kind of metal ion. A solubility of the first compound block relative to the etching solvent is greater than that of the second compound block.

In an example, a triboelectric generator comprising: a first electrode; a second electrode is spaced apart from the first electrode and has a polarity which is different from a polarity of the first electrode; and a nano-porous thin film of claim 1 between the first electrode and the second electrode. A triboelectric generator may operate in one of a vertical contact-separation mode, a sliding mode, a single-electrode mode and a freestanding triboelectric-layer mode.

In an example, a hybrid power supply system comprising: the triboelectric generator; a rechargeable energy storage unit coupled to the triboelectric generator; and a power management module receiving an input current from the triboelectric generator and delivering an output current corresponding to the input current to the rechargeable energy storage so that the rechargeable energy storage is refilled.

According to an embodiment of the present invention, a supramolecular structure formed from spherical micelles formed by self-assembling a first compound block constituting a core of a spherical micelle and a second compound block including a functional group constituting a shell of the spherical micelle, includes pores formed therein and metal ions selectively bonded to the functional groups, thereby providing a nano-porous thin film which is reversible and easily changes in contact surface characteristics, and which is simple to fabricate.

Further, according to another embodiment of the present invention, a method for fabricating a nano-porous thin film may be provided which has the above-mentioned advantages.

Further, according to another embodiment of the present invention, a triboelectric generator using a nano-porous thin film having the above-described advantages may be provided.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1A:
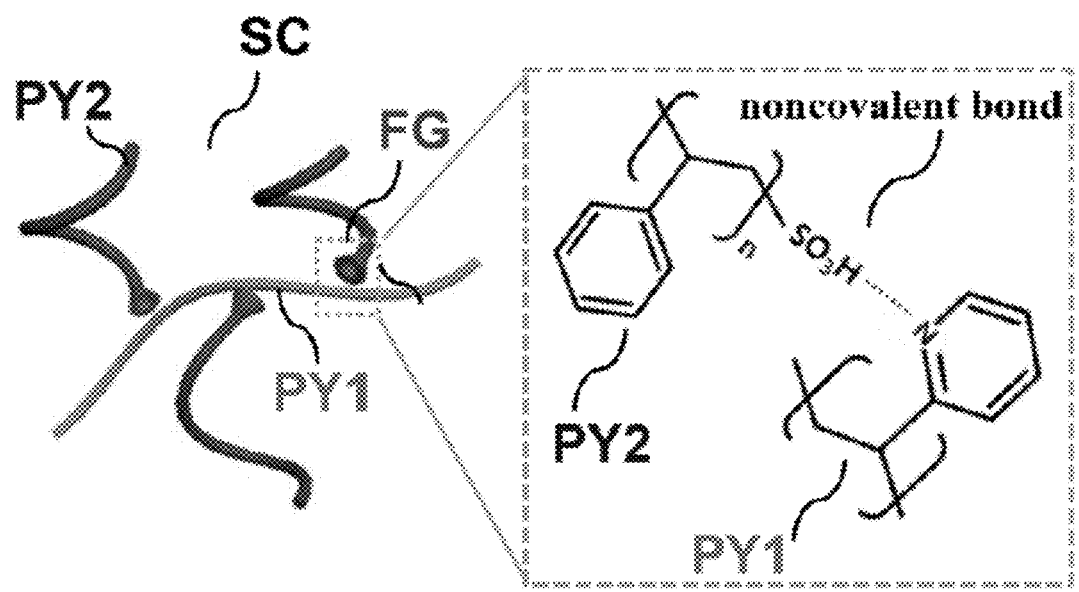
FIGS. 1A through 1D are views for illustrating a method of fabricating a nano-porous thin film according to an embodiment of the present invention

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

FIGS. 1A to 1D are views for illustrating a method of fabricating a nano-porous thin film according to an embodiment of the present invention, and FIGS. 2A to 3B illustrate a method of fabricating a nano-porous thin film according to an embodiment of the present invention.

Figure 1B:
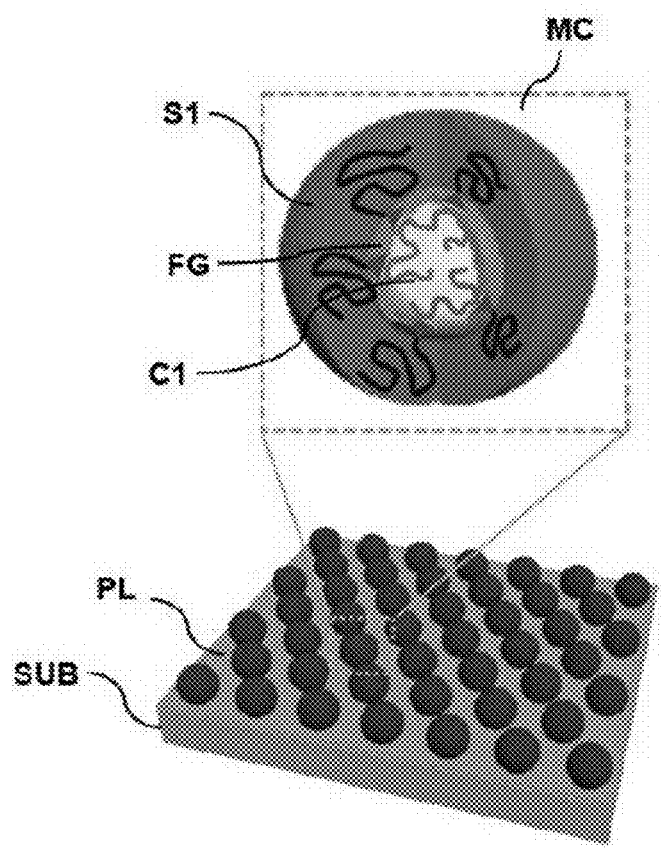

Referring to FIGS. 1A and 1B, a self-assembled spherical micelle (MC) is formed by chemically bonding a first compound block (PY1) and a second compound block (PY2), to form a supramolecular chemical compound or a supramolecular complex. The chemically bound first compound block and second compound block may be depicted as supramolecular complexes (SC), such as graft copolymers. The first compound block (PY1) functions as a backbone of the supramolecular complex (SC), and the at least one second compound block (PY2) may be chemically bonded to the backbone of the first compound block (PY1) as a graft. For example, in FIG. 1A, three second compound blocks (PY2) are chemically bonded to a first compound block (PY1). The second compound block (PY2) may have one or more chemical bond sites (FG) that may be chemically bonded to the first compound block (PY1), by noncovalent bonds such as hydrogen bonding, ionic interaction, charge-transfer interactions, coordination complexes and halogen bonds.

Supramolecular complexes (SC), such as a plurality of graft copolymers, may be self-assembled to form the spherical micelle (MC). The self-assembled spherical micelle (MC) may have nanometer-sized copolymer structures. For example, the self-assembled spherical micelle (MC) have an average diameter of 20 nm to 150 nm, preferably 20 nm to 90 nm. In this case, at least one of the first compound block (PY1) and the second compound block (PY2) may be a molecular-level building block. The average diameter of the self-assembled spherical micelles (MC) may be controlled by the mixing ratio of the first compound blocks (PY1) to the total of the first compound blocks (PY1) and the second compound blocks (PY2), or by a concentration of a solution having the first compound blocks (PY1) and the second compound blocks (PY2) and a dispersion solution. In another embodiment, the average diameter of the self-assembled spherical micelles (MC) may be controlled by the mixing ratio of the second compound blocks (PY2) to the total of the first compound blocks (PY1) and the second compound blocks (PY2).

Since the first compound block (PY1) and the second compound block (PY2) may be bonded to each other by a noncovalent bond, for example, a hydrogen bond, an etching ability of a specific domain, such as etching of the first compound block (PY1) from the self-assembled spherical micelle (MC) may be performed. The etching process may be performed by separating supramolecularly noncovalent bonds between the first compound block (PY1) and the second compound block (PY2), for example, using a selective etching solvent.

In an embodiment, at least one of the first compound block (PY1) and the second compound block (PY2) may have a functional group. For example, the second compound block (PY2) may have a functional group. In FIG. 1A, a plurality of second compound blocks (PY2) may have a functional group of sulfonic acid (—SO3H). A plurality of second compound blocks (PY2) are chemically bonded to the first compound block (PY1) based on hydrogen bonds between the sulfonic acid functional group of the second compound block (PY2) and the hydrogen atom of the first compound block (PY1) at the chemical bond sites (FG) of the first compound block (PY1).

The first compound block (PY1) or the second compound block (PY2) may include at least one functional group per molecule building block. Preferably, as described above, only the second compound block (PY2) may include at least one functional group per molecule building block. In an embodiment, the plurality of functional groups contained in the second compound block (PY2) may be two or more per molecule, and may be preferably 2 to 6 per molecule.

Referring to FIG. 1A, the first compound block (PY1) or the second compound block (PY2) may be a compound. The first compound block (PY1) and the second compound block (PY2) are mixed together with a dispersion solvent, and the mixed solution may be prepared so as to form spherical micelles (MCs) to be self-assembled together with a combination of the first compound block (PY1) and the second compound block (PY2). At least one of the first compound block (PY1) and the second compound block (PY2) may be a polymer including a functional group capable of hydrogen bond, and the functional group includes at least one of the following groups: —X2-(C=X4)-X3-, —NR5-(SO$_2$)—, —CO—NR6-CO—, —O—, —S—, —COOH, —CN, —NR7R8, —OH and —SH.

It is preferable that the first compound block (PY1) and the second compound block (PY2) includes at least one functional group selected from the above groups in one molecule. The number of groups selected from the above-mentioned groups included in the first compound block (PY1) or the second compound block (PY2) is preferably at least one in one molecule, more preferably two or more, more preferably two to eight, and it is more preferable that the number is two to six. Also, in one embodiment, the first compound block (PY1) or the second compound block (PY2) may be a compound including a cyclic structure including a hetero atom in a ring referred to as a heterocycle ring. In another embodiment, it may be a compound not containing a heterocycle ring.

In addition, each of the X2 and the X3 may be any one of a single bond, —NR9-, —O—, and —(CR10R11)m-. Each of the R5, R6, R7, R8, R9, R10, and R11 may represent a hydrogen atom or an alkyl group having a substituent, and m represents an integer equal to or greater than 1. The substituent group of the alkyl group, include one of an alkyl group (preferably having 1 to 20 carbon atoms, more preferably 1 to 12, particularly preferably 1 to 8 carbon atoms, for example, methyl, ethyl, isopropyl, tert-butyl group, n-octyl group, n-decyl group, n-hexadecyl group, cyclopropyl group, cyclopentyl group, cyclohexyl group, etc.), an alkenyl group (preferably having 2 to 20 carbon atoms, more preferably 2 to 12, particularly preferably 2 to 8 carbon atoms, for example, vinyl group, allyl group, 2-butenyl group, 3-pentenyl group, etc.), an alkynyl group (preferably having from 2 to 20 carbon atoms, preferably from 2 to 12 carbon atoms, more preferably from 2 to 8, for examples, a propargyl group and a 3-pentynyl group, etc.), an aryl group (preferably having 6 to 30 carbon atoms, more preferably 6 to 20, particularly preferably 6 to 12, such as phenyl, biphenyl, naphthyl, etc.), an amino group (preferably having from 0 to 20 carbon atoms, more preferably from 0 to 10 carbon atoms, particularly preferably 0 to 6 carbon atoms, for example, amino group, methylamino group, dimethylamino group, diethylamino group, a dibenzylamino group, etc.), an alkoxy group (preferably having from 1 to 20 carbon atoms, more preferably from 1 to 12 carbon atoms, particularly preferably from 1 to 8 carbon atoms, for example, methoxy group, ethoxy group and butoxy group), an aryloxy group (preferably from 6 to 20 carbon atoms, more preferably 6 to 16 carbon atoms, and particularly preferably 6 to 12 carbon atoms, such as phenyloxy, 2-naphthyloxy, etc.), an acyl group (preferably having from 1 to 20 carbon atoms, more preferably from 1 to 16 carbon atoms, particularly preferably from 1 to 12 carbon atoms, such as acetyl group, benzoyl group, formyl group, pivaloyl group, etc.), an alkoxycarbonyl group (preferably having from 2 to 20 carbon atoms, more preferably from 2 to 16 carbon atoms, and particularly preferably 2 to 12 carbon atoms, for example, methoxycarbonyl group, ethoxycarbonyl group, etc.), an aryloxycarbonyl group (preferably having from 7 to 20 carbon atoms, more preferably 7 to 16, particularly preferably 7 to 10, such as phenyloxycarbonyl), an acyloxy group (preferably having from 2 to 20 carbon atoms, more preferably from 2 to 16, particularly preferably from 2 to 10, such as acetoxy group and benzoyloxy group), an acylamino group (preferably having from 2 to 20 carbon atoms, more preferably 2 to 16, particularly preferably from 2 to 10, such as acetylamino group and a benzoylamino group), an alkoxycarbonylamino group (preferably having 2 to 20 carbon atoms, more preferably from 2 to 16, particularly preferably 2 to 12, such as methoxycarbonyl group, etc.), an aryloxycarbonylamino group (preferably having from 7 to 20 carbon atoms, more preferably 7 to 16, particularly preferably from 7 to 12 carbon atoms, for example, phenyloxycarbonylamino group, etc.), a sulfonylamino group (preferably having from 1 to 20 carbon atoms, more preferably from 1 to 16, and particularly preferably from 1 to 12 carbon atoms, for example, methanesulfonylamino group, benzenesulfonylamino group, etc.), a sulfamoyl group (preferably having from 0 to 20 carbon atoms, more preferably from 0 to 16, particularly preferably from 0 to 12 carbon atoms, such as a sulfamoyl group, methylsulfamoyl group, dimethylsulfamoyl group, phenylsulfamoyl group, etc.), a carbamoyl group (preferably having from 1 to 20 carbon atoms, more preferably from 1 to 16, particularly preferably from 1 to 12 carbon atoms, such as carbamoyl group, methylcarbamoyl group, diethylcarbamoyl group, phenylcarbamoyl group, etc.), an alkylthio group (preferably having from 1 to 20 carbon atoms, more preferably 1 to 16, particularly preferably 1 to 12 carbon atoms, such as methylthio group and ethylthio group, etc.), an arylthio group (preferably having from 6 to 20 carbon atoms, more preferably from 6 to 16, particularly preferably from 6 to 12 carbon atoms, such as phenylthio group, etc.), a sulfonyl group (preferably having from 1 to 20 carbon atoms, more preferably from 1 to 16, and particularly preferably from 1 to 12 carbon atoms. such as mesyl group and a tolyl group), a sulfinyl group (preferably having from 1 to 20 carbon atoms, more preferably 1 to 16, particularly preferably 1 to 12, such as a methanesulfinyl group and a benzenesulfinyl group, etc.), a urethane group, a ureide group (preferably having from 1 to 20 carbon atoms, more preferably from 1 to 16, and particularly preferably from 1 to 12, such as ureido group, methylureido group, phenylureido group, etc.), a phosphate amide group (preferably having from 1 to 20 carbon atoms, more preferably from 1 to 16, and particularly preferably from 1 to 12, such as diethylphosphoric acid amide, phenylphosphoric acid amide, etc.), a hydroxyl group, a mercapto group, a halogen atom (for example, a fluorine atom, a chlorine atom, a bromine atom, an iodine atom, etc.), a cyano group, a sulfo group, a carboxyl group, a nitro group, a hydroxyl group, a sulfino group, a hydrazino group, an imino group, a heterocyclic group (preferably having from 1 to 30 carbon atoms, more preferably from 1 to 12 carbon atoms, and the hetero atom includes one of a nitrogen atom, an oxygen atom, more particularly, for example, imidazolyl group, pyridyl group, quinolyl group, furyl group, piperidyl group, morpholino group, benzoxazole group, benzimidazolyl group, benzthiazolyl group, etc.), a silyl group (preferably having from 3 to 40 carbon atoms, more preferably from 3 to 30 carbon atoms, and particularly preferably from 3 to 24 carbon atoms, such as a trimethylsilyl group, a triphenylsilyl group, etc.).

In one embodiment, the alkyl group having a substituent group is preferably an alkyl group having 1 to 3 carbon atoms having a substituent group, is more preferably an unsubstituted alkyl group having 1 to 3 carbon atoms, is more preferably a methyl group, an ethyl group, or an isopropyl group. The —NR9- is preferably —NH—. The —(CR10R11)m- is an alkylene group which may be substituted by an alkyl group having a substituent group. The alkyl group is preferably an unsubstituted alkyl group, more preferably an unsubstituted alkyl group having 1 to 4 carbon atoms. Preferably, one direction of at least one of R10 and R11 in CR10R11 is a hydrogen atom, and both direction of them may be a hydrogen atom. m is an integer of 1 or more and is preferably an integer in the range of from 1 to 3. X4 represents an oxygen atom or a sulfur atom, and preferably represents an oxygen atom.

The first compound block (PY1) is preferably a group selected from the above-mentioned groups and preferably includes one or more —O—C(=O)—NH— in one molecule, more preferably from 1 to 8. In one embodiment, more preferably two to four.

In one embodiment of the present invention, the first compound block (PY1) and the second compound block (PY2) may include different functional groups (FG). For example, when the first compound block (PY1) comprises a cationic functional group, the second compound block (PY2) may comprises an anionic functional group. Alternatively, when the first compound block (PY1) comprises an anionic functional group, the second compound block (PY2) may comprises a cationic functional group. The anionic functional group may be at least one member selected from the group consisting of a sulfonate group, a sulfonic acid group, a phosphate group, a sulfate group and a hydroxyl group, and the cationic functional group may include an amide group. However, the ionic functional groups in the present invention are not limited thereto.

The first compound block (PY1) is selected from the group consisting of poly-2-vinylpyridine (P2VP), pyrimidine, 2-methylpyrimidine, 4-methylpyrimidine, 5-methylpyrimidine, 4,6-dimethylpyrimidine, 4,6-dimethoxypyrimidine, 2-ethoxypyrimidine, 2-ethylpyrimidine, 4-ethylpyrimidine, 5-ethylpyrimidine, 4,6-diethylpyrimidine, 2-methoxypyrimidine, 4-methoxypyrimidine, 5-methoxypyrimidine, 2-ethoxypyrimidine, 4-ethoxypyrimidine, 5-ethoxypyrimidine, polyamic acid, and polyolefin ketone, and the second compound block (PY2) may include at least one of syndiotactic polystyrene, polystyrene, sulfuronite polystyrene, and sulfuronite silsesquioxane.

In one embodiment of the present invention, the first compound block (PY1) may be a compound having pyridine in which the carbon in the benzene ring is substituted with a nitrogen atom that facilitates hydrogen bond, and the second compound block (PY2) may be a compound having a sulfonate group. Preferably, the first compound block (PY1) may be a poly (2-vinylpyridine) P2VP and the second compound block (PY2) may be a sulfonated polystyrene (SPS).

The dispersion solvent may be one of aliphatic or aromatic hydrocarbons (such as heptane and toluene), halogenated aliphatic or aromatic hydrocarbons (such as dichloromethane and bromobenzene), ethers (such as diethyl ether), $H_2O$, ethanol and methanol, or a mixture thereof, and the present invention is not limited thereto as long as it is a polar solvent. Preferably, the dispersion solvent may be benzene or methanol.

The first compound block (PY1) and the second compound block (PY2) mixed in the dispersion solvent are hydrogen bonded by the functional group (FG) included in the first compound block (PY1) or the second compound block (PY2). In one embodiment, when the first compound block (PY1) is poly-2-vinylpyridine (P2VP) and the second compound block (PY2) is a sulfonated polystyrene (SPS), the nitrogen (N) atom of the first compound block (PY1) and the oxygen atom of the sulfonated group in the second compound block (PY2) may be hydrogen bonded.

The first compound block (PY1) and the second compound block (PY2) are self-assembled by hydrogen bonding, to form a spherical micelle (MC) having a core-shell (or core-corona) structure. The core-shell structure may include a core layer (C1) formed inside the spherical micelle (MC) and a shell layer (S1) surrounding the core layer (C1). The first compound block (PY1) may form a backbone of the spherical micelle in the spherical micelle (MC) and the second compound block (PY2) may form a side chain in which are hydrogen bonded with the first compound block (PY1).

The first compound block (PY1) may be a compound having a lower solubility in the dispersion solvent than that of the second compound block (PY2). When the first compound block (PY1) and the second compound block (PY2) are hydrogen bonded in the dispersion solvent, the second compound block (PY2) having a high affinity with the dispersion solvent may be included in the shell layer (S1), and the first compound block (PY1) having relatively low affinity with the dispersion solvent may be included in the core layer (C1).

Referring to FIG. 1B, a substrate (SUB) may be provided. The substrate (SUB) may have a first surface (ex, upper surface) and a second surface (ex, lower surface) facing the first surface. The substrate (SUB) may be flexible and be formed of a transparent resin-based material.

The resin-based material may be, for example, various cellulose-based resins; polyester resins such as polyethylene terephthalate (PET) and polyethylene naphthalate (PEN); polyethylene resin; polyvinyl chloride resin; polycarbonate (PC); polyethersulfone (PES); polyetheretherketone (PEEK); polyphenylene sulfide (PPS); and polytriphenylamine (PTAA), or a combination thereof, preferably, polytriphenylamine (PTAA).

In addition, the substrate (SUB) may be composed of silicate glass. For example, the substrate (SUB) may be composed of soda-lime-silica based glass. In this case, the substrate (SUB) may be referred to as a glass substrate. However, the material of the substrate (SUB) may be variously changed. Other transparent materials besides the soda-lime-silica based glass may be applied to the substrate (SUB).

A mixed solution layer (not shown) including a plurality of spherical micelles (MCs) may be formed on a substrate (SUB). The mixed solution layer may include a plurality of spherical micelles (MCs) in which a first compound block (PY1) block and a second compound block (PY2) block are hydrogen bonded and self-assembled. The compound blocks may refer to at least some of chemical formulas of the compounds. For example, the first compound block (PY1) block and the second compound block (PY2) block may be the compounds described with reference to FIG. 1A, and the spherical micelle (MC) may be core layer (C1) and shell layer (S1) described with reference to FIG. 1B.

Figure 2A:
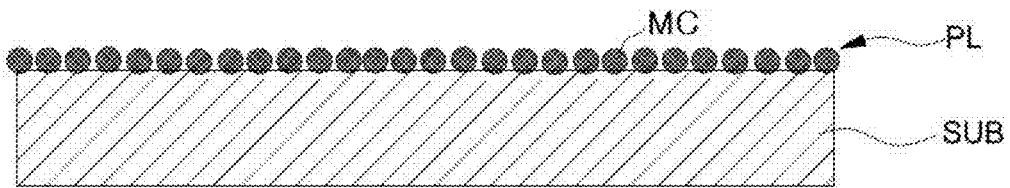
FIGS. 2A and 2B are cross-sectional views illustrating a method of fabricating a nano-porous thin film according to an embodiment of the present invention.
Figure 2B:
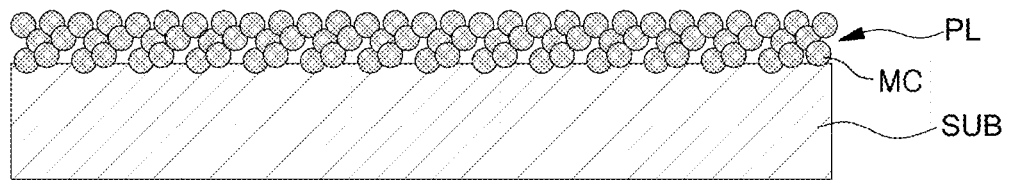

The mixed solution layer may be formed by coating or printing on the substrate (SUB). The coating or printing method may be a method such as spin coating, spray coating, printing, vacuum filtration, impregnation coating, and application coating. When the mixed solution layer is coated or printed on the substrate (SUB), the first compound block (PY1) and the second compound block (PY2) contained in the mixed solution layer (PL) may be self-assembled as a core-shell structure of spherical micelles (MCs). In the mixed solution layer, the spherical micelles (MCs) may be uniformly or approximately uniformly dispersed. Also, in the mixed solution layer, the spherical micelles (MCs) may be formed as a single layer on the substrate (SUB) as shown in FIG. 2A or may be formed in a multilayer on the substrate (SUB) as shown in FIG. 2B.

Then, the size (mean diameter) of the spherical micelle (MC) is controlled according to a concentration of the second compound block (PY2), or the mean diameter of the pores in the supramolecular structure is controlled by total content of the first compound block (PY1) and the second compound block (PY2) or the mixing ratio of the first compound block (PY1) and the second compound block (PY2).

Figure 1C:
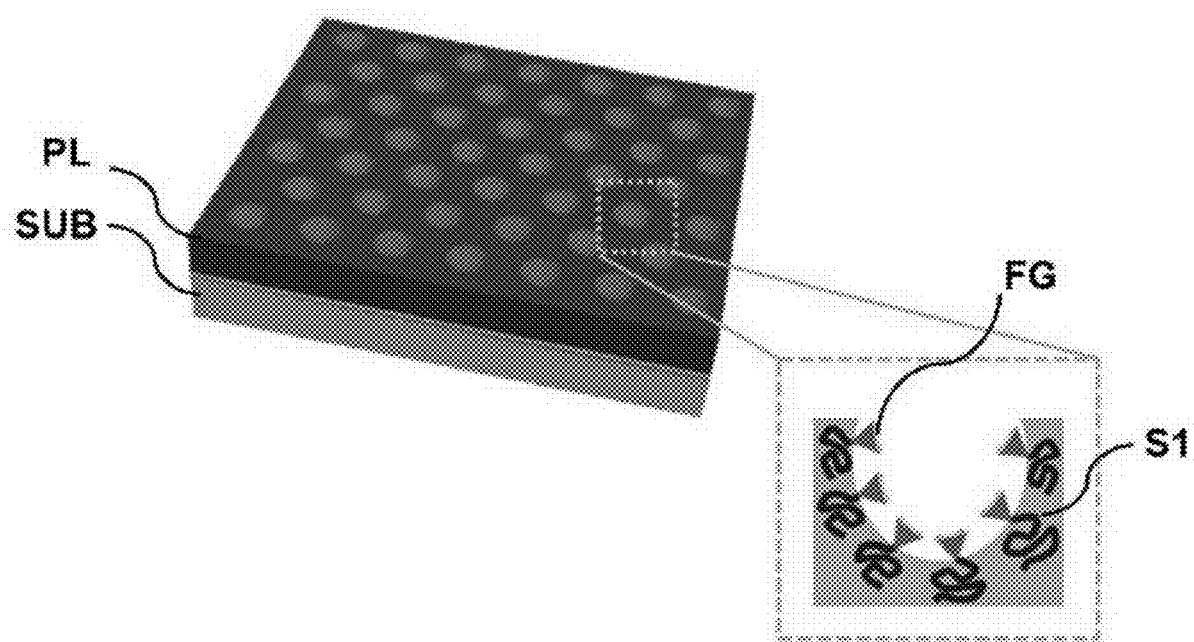
Figure 3A:
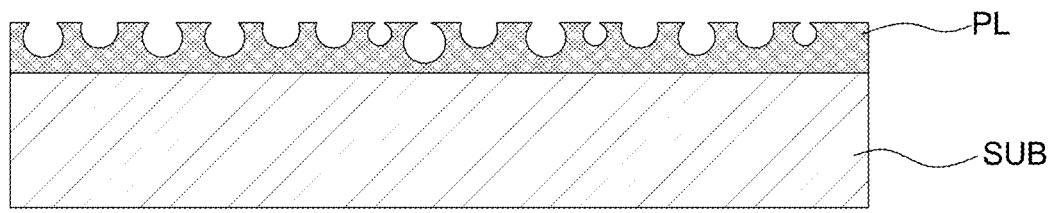
FIGS. 3A and 3B are cross-sectional views illustrating a method of fabricating a nano-porous thin film according to an embodiment of the present invention.
Figure 3B:
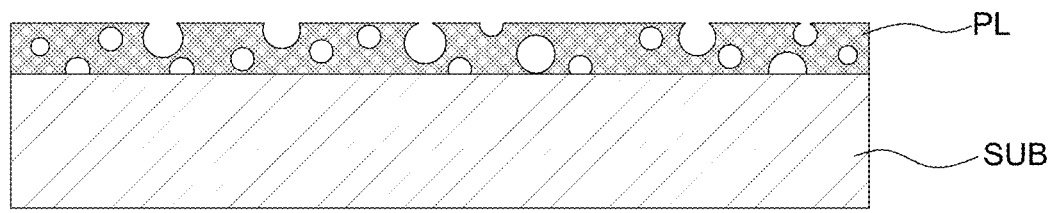

Referring to FIG. 1C, a polymer layer (PL) having a plurality of pores may be formed from the mixed solution layer using an etching solvent. In some embodiments, the first compound block (PY1) and the second compound block (PY2), which did not participate in the formation of the spherical micelles (MCs), may be removed from the mixed solution layer having the spherical micelles (MCs) formed before the etching process. The removal process may include a drying or washing process. When performing the removal process, the mixed solution layer may form the polymer layer (PL) in which the spherical micelles (MCs) are closely packed. The polymer layer (PL) may include spherical micelles (MCs) as a single layer as shown in FIG. 3A or as a plurality of layers as shown in FIG. 3B. In one embodiment, the mean size of the spherical micelle MC may be larger as the period of time required for the removal process is longer.

Thereafter, the polymer layer (PL) and the substrate (SUB) are etched using an etching solvent to remove the first compound block (PY1) of the spherical micelles MCs included in the polymer layer (PL), thereby a plurality of pores in the polymer layer (PL) may be formed. In the etching process, the etchant selectively penetrates the core layer (C1) where the first compound block (PY1) is disposed in the spherical micelles (MCs) to loosen a hydrogen bond between the first compound block (PY1) and the second compound block (PY2), and thus the core layer (C1) containing the first compound block (PY1) is removed from the spherical micelle (MC) to form spherical micelles (MCs) having a cavity. Therefore, due to the arrangement of the spheres having the cavity, a plurality of pores may be formed in the polymer layer (PL).

Thus, the first compound block (PY1) and the second compound block (PY2) may have different solubilities with respect to the etchant. Preferably, the first compound block (PY1) may have a solubility greater than the solubility of the second compound block (PY2) in the etch solvent.

As a result, the porous layer (or the polymer layer (PL)) having a plurality of pores may be formed by the etching process. The thickness of the porous layer (PL) may have, for example, 1 nm to 500 nm. If the thickness of the porous layer (PL) is more than 500 nm, it is difficult to form a plurality of pores by the etching process, and the effect of preventing reflection may be insufficient. However, this is exemplary, and the thickness range of the porous layer (PL) may be not limited.

The etching process may be performed for 10 minutes to 30 minutes. When the etching process is performed for more than 30 minutes, it may affect not only the compound of the core layer (C1) but also the compound of the shell layer (S1). Considering these points, the etching conditions may be appropriately controlled. The core layer (C1) containing the first compound block (PY1) may be removed so that the spheres having the cavities may have a sulfonated group remaining on an inside surface of the shell layer (S1). The sulfonated group may serve as a potential functional group of the spherical micelle having the cavity. For example, it may be reversibly hydrogen bonded with a pyrimidine-based compound or a purine-based compound to form a self-assembled polymer, or it may have high electrochemical stability at a high temperature due to its high proton conductivity by the sulfonated group. However, the function of the potential functional groups remaining on the surface of the shell layer (S1) is not limited thereto.

Figure 1D:
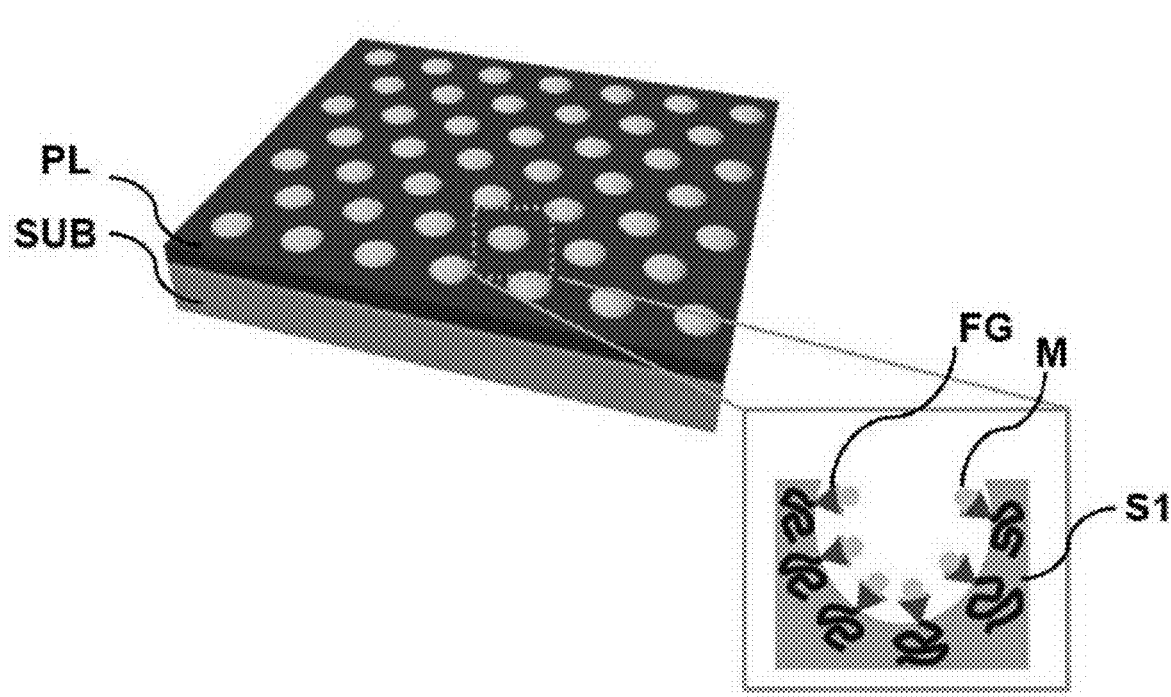

Referring to FIG. 1D, cations (M) or anions (M) may be adsorbed onto the potential functional group (FG) remaining on the inside surface of the shell layer (S1), by using an aqueous solution or an electrolyte solution including metal ions. The metal ions (M) chemically bonded to the plurality of functional groups (FG) of the second compound block (PY2) may be formed on the surface of the nano-porous thin film. The chemical bond may be any one of an ionic bond, a covalent bond, a metal bond, and a coordination bond.

In one embodiment of the present invention, the metal ions may include any one of a monovalent cation, a divalent cation and a trivalent cation. The monovalent cation includes an alkali metal ion of a Group $1^{th}$, the divalent cation includes an alkaline earth metal ion of a Group $2^{nd}$, and the trivalent cation is an aluminum ion ($Al^{3+}$) and an iron ion (III) $Fe^{3+}$. The alkali metal ion may be any one of hydrogen ion ($H^+$), lithium ion ($Li^+$), sodium ion ($Na^+$), potassium ion ($K^+$), rubidium ion ($Rb^+$), cesium ion ($Cs^+$) and franc ion ($Fr^+$) and the alkaline earth metal ion may include any one of beryllium ion ($Be^{2+}$), magnesium ion ($Mg^{2+}$), calcium ion ($Ca^{2+}$), strontium ion ($Sr^{2+}$), barium ion ($Ba^{2+}$) and radium ion ($Ra^{2+}$).

In one embodiment of the present invention, the nano-porous thin film has high proton conductivity by the sulfonated group, and thus may have excellent electrochemical stability at a high temperature, and the alkali metal ion may be selectively adsorbed onto the sulfonated group. However, the function of the potential functional groups remaining on the surface of the shell layer is not limited thereto.

In some embodiments, the porous layer (PL) having pores includes a rugged surface (upper surface) (not flat surface). As described above, since the porous layer (PL) has uneven irregularities on at least one surface (or interface), the total reflection is prevented or suppressed by the irregularities, and a light extraction efficiency may be improved.

According to an embodiment of the present invention, alkali metal ions may be selectively and easily adsorbed to the nano-porous thin film (PL) by using the above-described method, and a triboelectric generator including the same may be easily fabricated. Herein, a nano-porous thin film (PL) including alkali metal ions may be referred to as a surface textured polymer layer.

In one embodiment of the present invention, a triboelectric nano-generator comprising a nano-porous thin film may include sulfo group ($SO_3^-$) formed on surface of nanopores formed by a supra-molecular assembly of sulfonic acid-terminated polystyrene (SPS) and poly 2-vinylpyridine (P2VP). A triboelectric nano-generator coupled with mechanically strong alkali metal ions may be provided by selectively binding alkali metal ions such as $Li^+$, $Na^+$, $K^+$, and $Cs^+$ to the sulfo group ($SO_3^-$). An output performance of the triboelectric nano-generator of the present invention is highly dependent on the alkali metal ions, and the output power of the triboelectric nano-generator may range approximately from 11.5 µW to 256.5 µW. In addition, the alkali metal ions formed on the nano-porous thin film are easily exchanged with other ions in a reversible manner (hereinafter, referred to as 'ion exchange'), thereby controlling reversibly a wide range of output performance in a single device platform. The ion exchange may mean that when a substance is brought into contact with an electrolyte aqueous solution, ions in the substance are released from the substance and other ions in electrolyte aqueous solution are adsorbed onto the substance.

A conventional generator has been developed in such a manner that the reactivity with the ions on the surface is formed through one process of forming a structure and another process of forming a functional group on the surface. Fabrication process of the conventional generator are very complicated due to the process of forming functional groups on the surface. However, the present invention is advantageous in that the supramolecular self-assembled thin film is applied to the generator to simultaneously control the functional group and the surface shape, thereby shortening the process time in the fabrication process of the generator. Also, the present invention may be applied to a wearable device, as it is fabricated on a transparent and flexible substrate and the characteristics of ion treatment are confirmed.

Figure 4A:
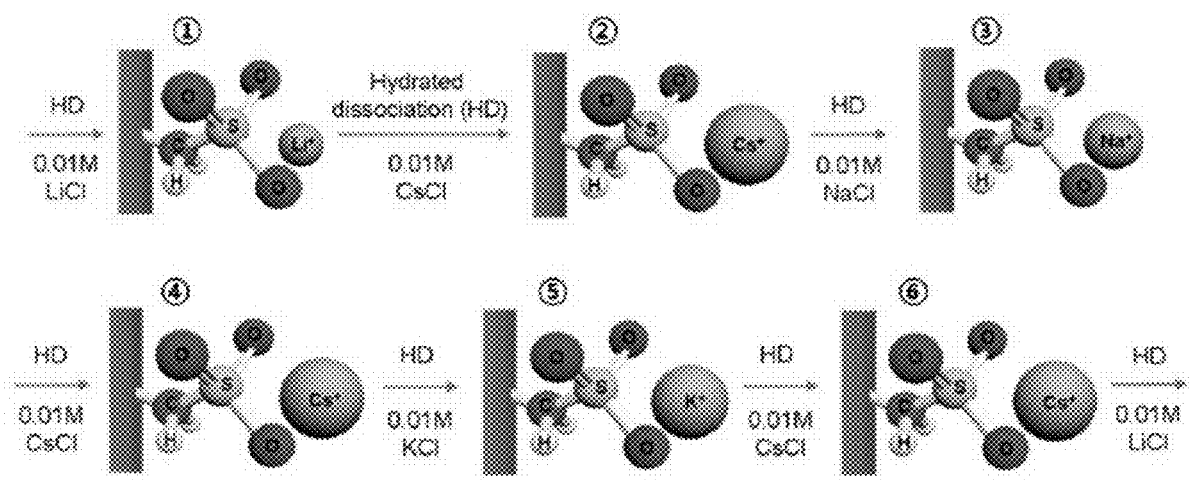
FIG. 4A is a view for illustrating ion exchange between ions chemically bonded to a functional group formed on the surface of a nano-porous thin film according to an embodiment of the present invention.
Figure 4B:
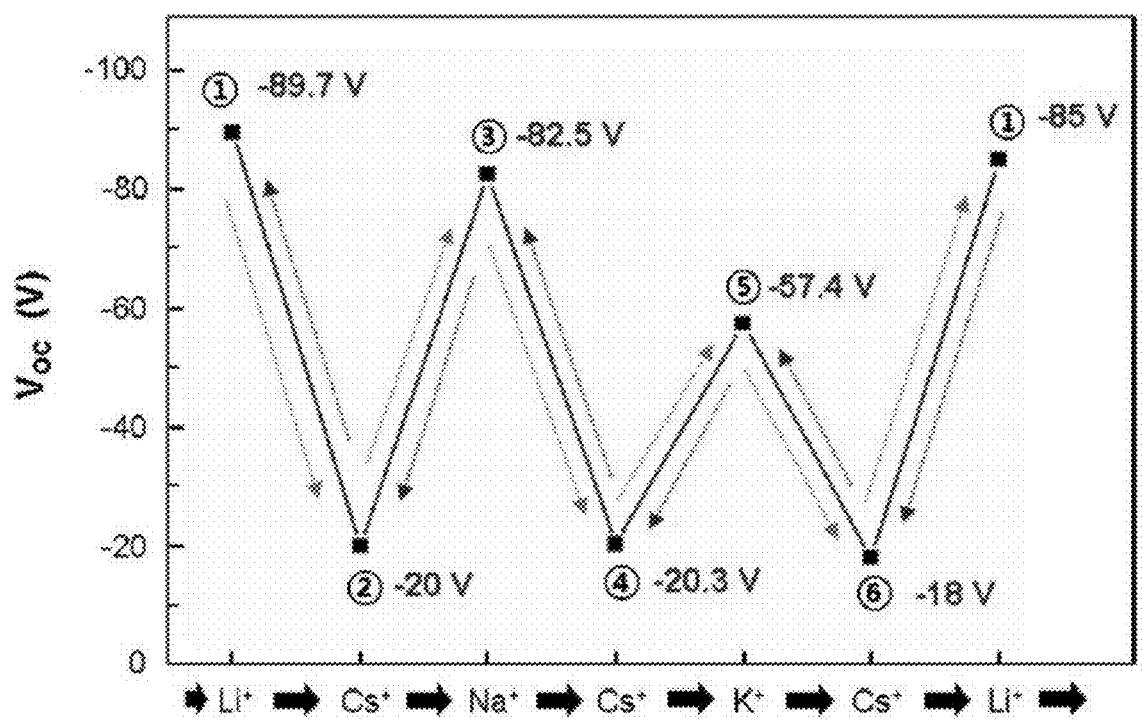
FIG. 4B is a graph showing the output voltage of a triboelectric generator using a nano-porous thin film according to ion exchange.

FIG. 4A is a view for illustrating ion exchange between ions chemically bonded to a functional group formed on the surface of a nano-porous thin film according to an embodiment of the present invention. FIG. 4B is a graph showing the output voltage of a triboelectric generator using a nano-porous thin film according to ion exchange of FIG. 4A.

Referring to FIG. 4A, an alkali ion may be chemically bonded to a functional group (for example, a sulfone group ($SO_3^-$) on the surface of a nano-porous thin film, by performing ion exchange in the order of lithium ion ($Li^+$) →cesium ion ($Cs^+$)→sodium ion ($Na^+$)→cesium ion ($Cs^+$) →potassium ion ($K^+$)→cesium ion ($Cs^+$)→lithium ion ($Li^+$).

For example, in order to ion exchange lithium ion ($Li^+$) chemically bonded to a functional group (e.g., sulfone group ($SO_3^-$)) on the surface of a nano-porous thin film with cesium ion ($Cs^+$), the porous thin film may be immersed in a cesium chloride (CsCl) solution (①). At this time, a cesium ion ($Cs^+$) may be chemically bonded to a functional group (e.g., a sulfone group ($SO_3^-$)) on the surface of the nano-porous thin film. In order to ion-exchange cesium ion ($Cs^+$) chemically bonded to a functional group (for example, sulfonic acid group ($SO_3^-$)) on the surface of the nano-porous thin film with sodium ion ($Na^+$), the nano-porous thin may be immersed in a sodium chloride (NaCl) (②). At this time, sodium ion ($Na^+$) may be chemically bonded to a functional group (e.g., a sulfone group ($SO_3^-$) on the surface of the nano-porous thin film. In order to ion exchange sodium ion ($Na^+$) chemically bonded to a functional group (for example, sulfonic acid ($SO_3^+$)) on the surface of the nano-porous thin film with cesium ion ($Cs^+$), the porous thin film may be immersed in the cesium chloride (CsCl) solution (③). At this time, a cesium ion ($Cs^+$) may be chemically bonded to a functional group (e.g., a sulfone group ($SO_3^-$)) on the surface of the nano-porous thin film. In order to ion exchange cesium ion ($Cs^+$) chemically bonded to a functional group (for example, sulfone group ($SO_3^-$)) with potassium ion ($K^+$) on the surface of the nano-porous thin film, the nano-porous thin film may be immersed in a potassium chloride (KCl) (④). At this time, potassium ion ($K^+$) may be chemically bonded to a functional group (e.g., sulfone group ($SO_3$—)) on the surface of the nano-porous thin film. In order to ion exchange potassium ion ($K^+$) chemically bonded to a functional group (for example, sulfone group ($SO_3^-$)) on the surface of the nano-porous thin film by cesium ion ($Cs^+$), the porous thin film may be immersed in the cesium chloride (CsCl) solution (⑤). At this time, a cesium ion ($Cs^+$) may be chemically bonded to a functional group (e.g., a sulfone group ($SO_3^-$)) on the surface of the nano-porous thin film. Next, in order to ion-exchange cesium ions ($Cs^+$) chemically bonded to a functional group (for example, a sulfone group ($SO_3^-$)) on the surface of the nano-porous thin film with lithium ions ($Li^+$), the porous thin film may be immersed in a Lithium chloride (LiCl) (⑥). At this time, lithium ions ($Li^+$) may be chemically bonded to a functional group (e.g., a sulfone group ($SO_3^-$)) on the surface of the nano-porous thin film.

By sequentially exchanging alkali ions chemically bonded with a functional group (e.g., a sulfone group ($SO_3^-$)) on the surface of the nano-porous thin film to another alkali ion (from ① to ⑥), the surface characteristics of the nano-porous thin film (or characteristics of triboelectricity including the nano-porous thin film) may be reversibly switched. That is, the surface characteristics of the nano-porous thin film may be returned to the previous characteristics by the ion exchange. When the alkali metal ions are exchanged in the order of from step ① to step ⑥, the open circuit voltage ($V_{OC}$) of the triboelectric generator using the nano-porous thin film may be output as shown in FIG. 4B.

After the at least one ion exchange process of steps ① to ⑥ described above, the nano-porous thin film may be further immersed in a solvent such as $H_2O$ or alcohol for complete hydrate dissociation. In one embodiment of the present invention, in order to fabricate the triboelectric generator using the nano-porous thin film reversible and switchable, the nano-porous thin film may be successively immersed in a plurality of aqueous solutions containing a plurality of alkali ions so that ion exchange is performed as shown in FIG. 4A.

The size of ions depends on the type of ions, and the smaller the ion size, the greater the power of the triboelectric generator using the nano-porous thin film. For example, order of the ion size is lithium ion ($Li^+$)<sodium ion ($Na^+$) <potassium ion ($K^+$)<cesium ion ($Cs^+$), and order of the power level lithium ion ($Li^+$)>sodium ion ($Na^+$)>potassium ion ($K^+$)>cesium ion ($Cs^+$) because contrary to ion size, the smaller the ion size, the larger the bond. Thus, ion size of lithium ion ($Li^+$) may be small but power of lithium ion ($Li^+$) may be large, and ion size of cesium ion ($Cs^+$) may be large but power of cesium ion ($Cs^+$) may be small.

Referring to FIG. 4B, a triboelectric generator using a nano-porous thin film having an open circuit voltage of up to −89.7 V has an open circuit voltage of approximately −20 V when ion exchanged from lithium ion ($Li^+$) to cesium ion ($Cs^+$) (ex. ①→②), and an open circuit voltage of −82.5 V may be output after the cesium ion ($Cs^+$) is exchanged with sodium ion ($Na^+$) (ex. ②→③). In addition, the maximum open circuit voltages of the triboelectric generators after ion exchange with cesium ion ($Cs^+$), potassium ion ($K^+$), and cesium ion ($Cs^+$) (ex. ③→④→⑤→⑥) may be −20.3 V, −57.4 V and −18 V, respectively. Finally, when ion exchanged with lithium ion ($Li^+$), the maximum open circuit voltage of the triboelectric generator may appear to be approximately −85 volts. In one embodiment of the present invention, the maximum open circuit voltage ($V_{OC}$) of the triboelectric generator may be obtained, by reverse sequence (①-⑥-⑤-④-③-②-①), as well as forward sequence (①-②-③-④-⑤-⑥-①).

In one embodiment of the present invention, before the first ion is exchanged (or replaced) with the second ion, the nano-porous thin film containing the first ion is immersed in distilled water, $H_2O$ or alcohol to hydrate the first ion, thereafter the nano-porous thin film may be immersed in an aqueous solution of the second ion to replace the first ion with the second ion.

In one embodiment of the present invention, in order to obtain a reversible triboelectricity, the nano-porous thin film may be directly immersed in each aqueous solution of ion, thereby exchanging one ion with another ion. At this time, the maximum open circuit voltage may be obtained by substituting with each ion. In another embodiment of the present invention, when the ion exchange is performed in the direction from the second ion (for example, cesium) to the first ion (for example, lithium), the nano-porous thin film is immersed in distilled water, $H_2O$ or alcohol, thereby hydrating the ions in the nano-porous thin film. After hydrating the ions in the nano-porous thin film, then the nano-porous thin film is immersed in the respective ionic aqueous solution and the ions of the nano-porous thin film may be substituted with respective ions of the aqueous solution. Further, it is also possible to immerse in the same ionic aqueous solution by reusing the aqueous solution, to induce substitution of each ion.

Figure 5:
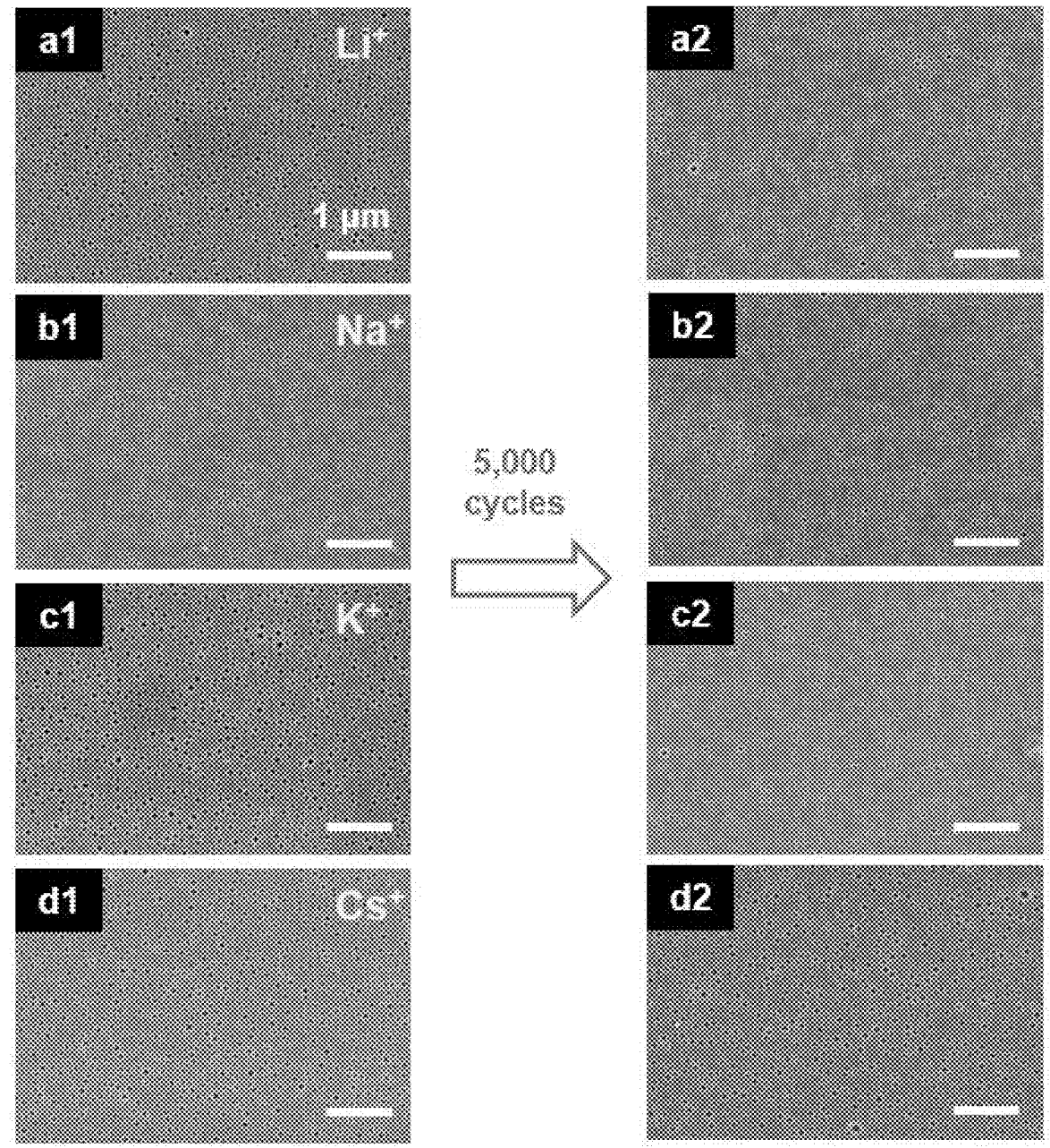
FIG. 5 is a scanning electron microscope (SEM) image of a nano-porous thin film that reacts with metal ions according to an embodiment of the present invention.

FIG. 5 is a scanning electron microscope (SEM) image of a nano-porous thin film that reacts with metal ions according to an embodiment of the present invention. a1 to d1 of FIG. 5 are SEM images of the nano-porous thin film before friction contact with the nano-porous thin film reacting with the metal ion, and a2 to d2 of FIG. 5 are SEM images of the nano-porous thin film reacting with the metal ion, after more than 5,000 friction contacts with the nano-porous thin film reacting with the metal ion. In particular, a1 and a2 are SEM images of nano-porous thin films reacting with lithium ions ($Li^+$) before and after the friction contact, b1 and b2 are SEM images of nano-porous thin films reacting with sodium ions ($Na^+$), c1 and c2 are SEM images of nano-porous thin films reacting with potassium ions ($K^+$) before and after the friction contact, and d1 and d2 are SEM images of nano-porous thin films reacting with cesium ions ($Cs^+$) before and after the friction contact. The diameter of the pores formed in the nano-porous thin film may be controlled according to the mixing ratio of the second compound block (PY2) to the first compound block (PY1).

Referring to FIG. 5, the mean size of pore in the each nano-porous thin film according to different metal ions is different, and when the size of the pore increases, the voltage may be slightly increased due to the increase of the friction area. However, the increase of the voltage due to the difference of the pores may be smaller than the increase of the voltage by the ions.

In another embodiment of the present invention, a triboelectric nano-generator using the aforementioned nano-porous thin film (PL) may be provided. The nano-porous thin film (PL) in the triboelectric nano-generator to be described later in FIG. 6 to FIG. 11D may be used as a friction material layer for generating a friction. The triboelectric generator may operate on one mode of a vertical contact-separation mode, a sliding mode, a single-electrode mode and a free-standing triboelectric-layer mode, according to operating mode for a contact with a friction material layer.

In one embodiment of the present invention, it is provided a nano-porous thin film which is functionalized with a functional group (for example, a sulfone group) capable of selectively adsorbing a cation (+) and a triboelectric nano-generator for generating electrical energy using the nano-porous thin film. In particular, it is provided a reversible and switchable triboelectric nano-generator based on a supramolecular assembly of two compounds so as to have a nano-porous structure comprising alkali metal ions at selective binding sites.

FIGS. 6 to 11d are cross-sectional views of a triboelectric generator using a nano-porous thin film (PL) that reacts with metal ions according to an embodiment of the present invention.

Figure 6:
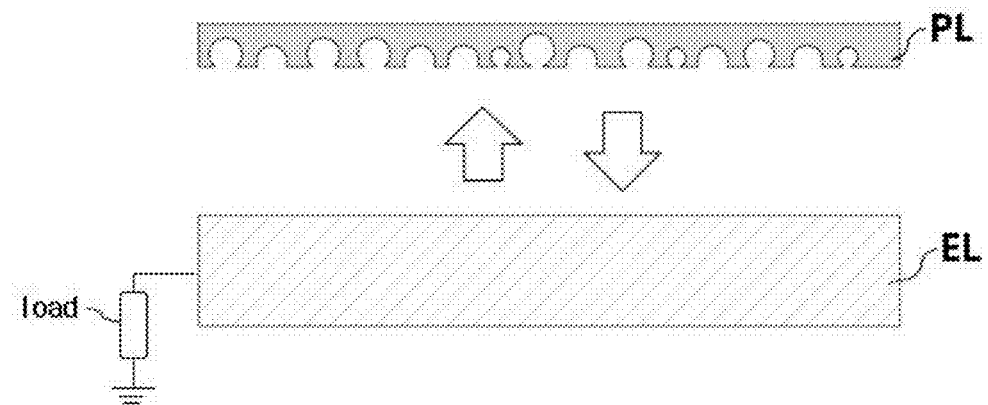
FIG. 6 through FIG. 11D are cross-sectional views of a triboelectric generator utilizing a nano-porous thin film that reacts with metal ions according to one embodiment of the present invention.

Referring to FIG. 6, the triboelectric generator of the single electrode mode includes a lower electrode (EL) and a nano-porous thin film (PL), and the lower electrode (EL) and the nano-porous thin film (PL) may be disposed to face each other. The nano-porous thin film (PL) is the same as the nano-porous thin film (PL) described above, and the above description can be referred to. The lower electrode (EL) is a metal or a metal oxide and the metal may include any one of aluminum (Al), copper (Cu), magnesium (Mg), tungsten (W), iron (Fe), platinum (Pt), gold (Au), silver (Ag), tantalum (Ta), titanium (Ti), palladium (Pd), ruthenium (Ru) or combinations of thereof. However, the metals in the present invention are not limited thereto.

In addition, the triboelectric generator may generate electric energy by using the friction between the lower electrode (EL) connected to a ground connection and the nano-porous thin film (PL). For example, when an external load is applied in the vertical direction, friction occurs between the lower electrode (EL) and the nano-porous thin film (PL), and positive and negative charges are generated on the friction surface. At this time, electrons may flow from an external circuit (not shown) through an electrical load so as to generate an output current, to maintain a charge equilibration with respect to the positive charges generated in the lower electrode (EL). Alternatively, the electrons may be transferred to the external circuit through the electrical load so as to generate an output current, to maintain a charge equilibration with respect to the negative charge generated in the lower electrode (EL).

Figure 7A:
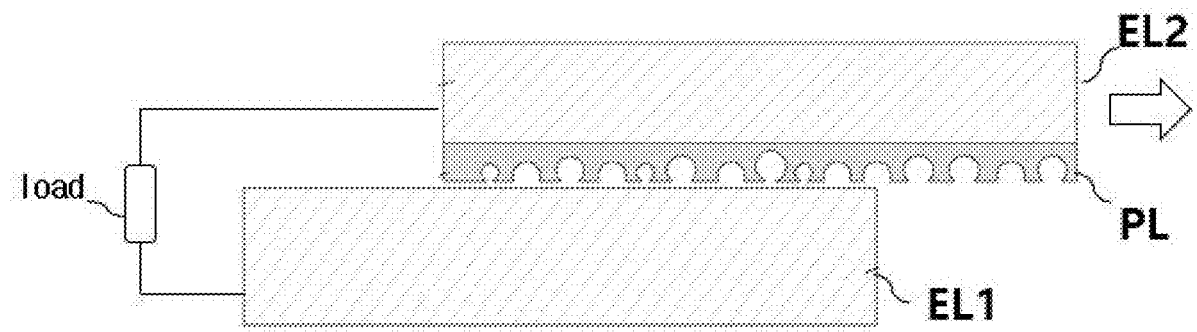
Figure 7B:
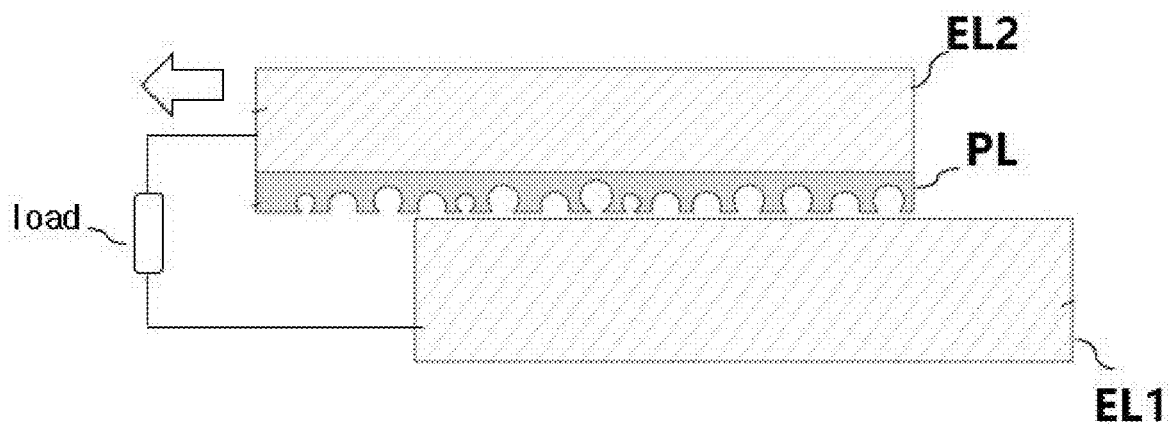

Referring to FIGS. 7A and 7B, the triboelectric generator of the sliding friction mode may include a first electrode (EL1), a second electrode (EL2), and a nano-porous thin film (PL). The nano-porous thin film (PL) is the same as the nano-porous thin film (PL) described above, and the above description can be referred to. The first electrode (EL1) and the second electrode (EL2) are the same as the above-described lower electrode (EL) of FIG. 6, and the above description can be referred to.

The upper surface of the nano-porous thin film (PL) may be in contact with the lower surface of the second electrode (EL2) and the nano-porous thin film (PL) is fixed to the second electrode (EL2). The lower surface of the nano-porous thin film (PL) may be in contact with the upper surface of the first electrode (EL1). When an external load is applied in the horizontal direction, a friction may occur at surface between the nano-porous thin film (PL) and the first electrode (EL1) (hereinafter referred to as 'contact surface') and positive and negative charges may be generated on the surface of the nano-porous thin film (PL) and the surface of the first electrode (EL1). For example, the negative charges may be generated on the lower surface of the nano-porous thin film (PL) and the positive charges may be generated on the upper surface of the first electrode (EL1). Alternatively, the positive charges are generated on the lower surface of the nano-porous thin film (PL) and the negative charge sis generated on the upper surface of the first electrode (EL1). At this time, an output current may flow through an electrical load connecting with the first electrode (EL1) and the second electrode (EL2) so as to maintain a charge equilibration with respect to the positive charges generated in the nano-porous thin film (PL) or the first electrode (EL1). Further, the contact surface between the lower surface of the nano-porous thin film (PL) and the upper surface of the first electrode (EL1) is slid by the external load, and thus the electric signal may be output through the electrical load connecting the first electrode (EL1) with the second electrode (EL2) and the electrodes EL2, and a direction of the electric signal may be periodically inverted, or a magnitude of the electric signal may change periodically.

Figure 8A:
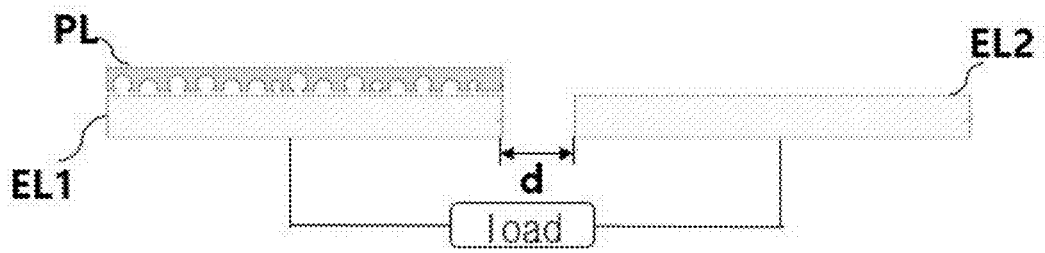
Figure 8B:
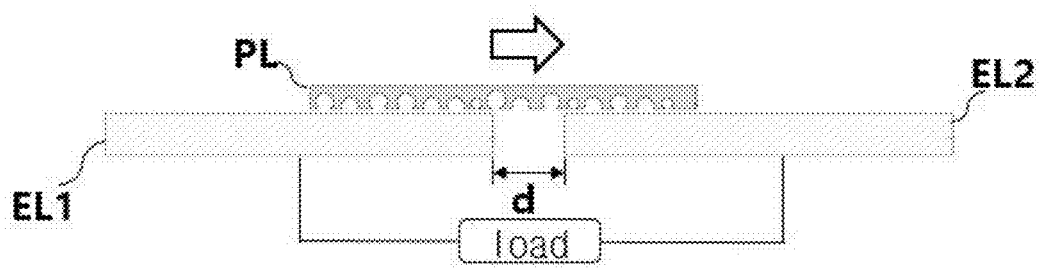
Figure 8C:
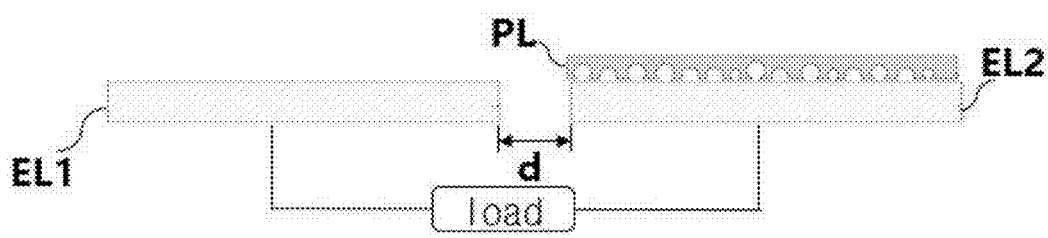
Figure 8D:
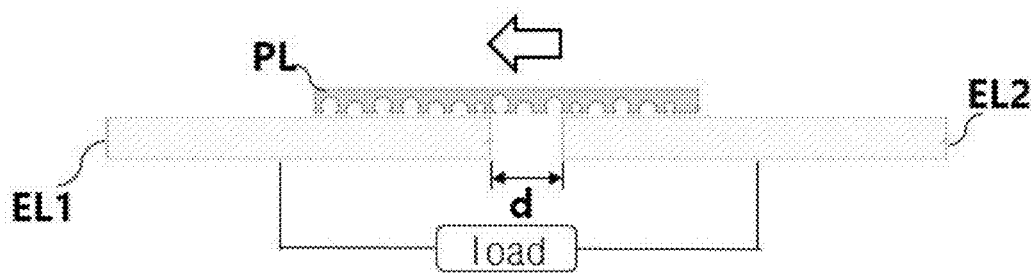

Referring to FIGS. 8A and 8D, the triboelectric generator of the free-standing friction mode may include a first electrode (EL1), a second electrode (EL2), and a nano-porous thin film (PL). The nano-porous thin film (PL) is the same as the nano-porous thin film (PL) of FIG. 6 described above, and the above description can be referred to. The first electrode (EL1) and the second electrode (EL2) are the same as the above-described lower electrode (EL) of FIG. 6, and the above description can be referred to. The triboelectric generator of the free-standing friction mode, in that the first electrode (EL1) and the second electrode (EL2) are horizontally spaced apart from each other by a predetermined distance (d), is different from the triboelectric generator of the sliding mode of FIGS. 7A and 7B.

By rubbing the surfaces of the first electrode (EL1) and the second electrode (EL2) due to a movement of the nano-porous thin film (PL), positive and negative charges are generated on the respective surfaces of the first electrode (EL1) and the second electrode (EL2). Output current is generated, so that the external circuit electrons may move through the electrical load, in order to maintain an equilibrium of charges between the electrodes (EL1) and (EL2). In some embodiments, even if there no a friction between the surface of the first electrode (EL1) (or the second electrode (EL2)) and a surface of the nano-porous thin film (PL) (that is, by noncontact method), positive and negative charges may be generated. At this time, the positive and negative charges may be generated in proportion to the contact area between the nano-porous thin film (PL) and the first electrode (EL1) or the second electrode (EL2). For example, when the nano-porous thin film (PL) is fully disposed on the surface of the first electrode (EL1) as shown in FIG. 8A, positive and negative charges are generated on the surfaces of the first electrode (EL1) and the nano-porous thin film (PL), respectively. And a charge may not be formed on the surface of the second electrode (EL2). Then, when the external force is applied in the horizontal direction (from left to right), the contact area between the nano-porous thin film (PL) and the first electrode (EL1) is reduced, and a contact area the nano-porous thin film (PL) and the second electrode (EL2) may be increased. At this time, a part of negative charge or positive charge formed on the surface of the first electrode (EL1) in FIG. 8A may be transferred to the second electrode (EL2), as shown in FIG. 8B. After, referring to FIG. 8C, when the nano-porous thin film (PL) is fully disposed on the surface of the second electrode (EL2) by the external force, positive and negative charges are generated on the surfaces of the second electrode (EL2) and the nano-porous thin film (PL), charge may be not formed on the surface of the first electrode (EL1). It may be seen that all of the negative or positive charges formed on the surface of the first electrode (EL1) in FIG. 8A are transferred to the second electrode (EL2). As shown in FIG. 8D. Finally, when an external load is applied in the horizontal direction (from right to left), the contact area between the nano-porous thin film (PL) and the second electrode (EL2) is reduced, and the contact area between the nano-porous thin film (PL) and the first electrode (EL1) may be increased. At this time, a part of negative charge or positive charge formed on the surface of the second electrode (EL2) in FIG. 8C may be transferred to the first electrode (EL1).

As a result, the contact surface between the first electrode (EL1) and/or the second electrode (EL2) and the nano-porous thin film (PL) is relatively slid so that the contact surface changes, thereby outputting electronic signal through a load connecting between the first electrode (EL1) the second electrode (EL2), and inverting periodically the direction of the electronic signal or changing a magnitude of the electronic signal.

Figure 9:
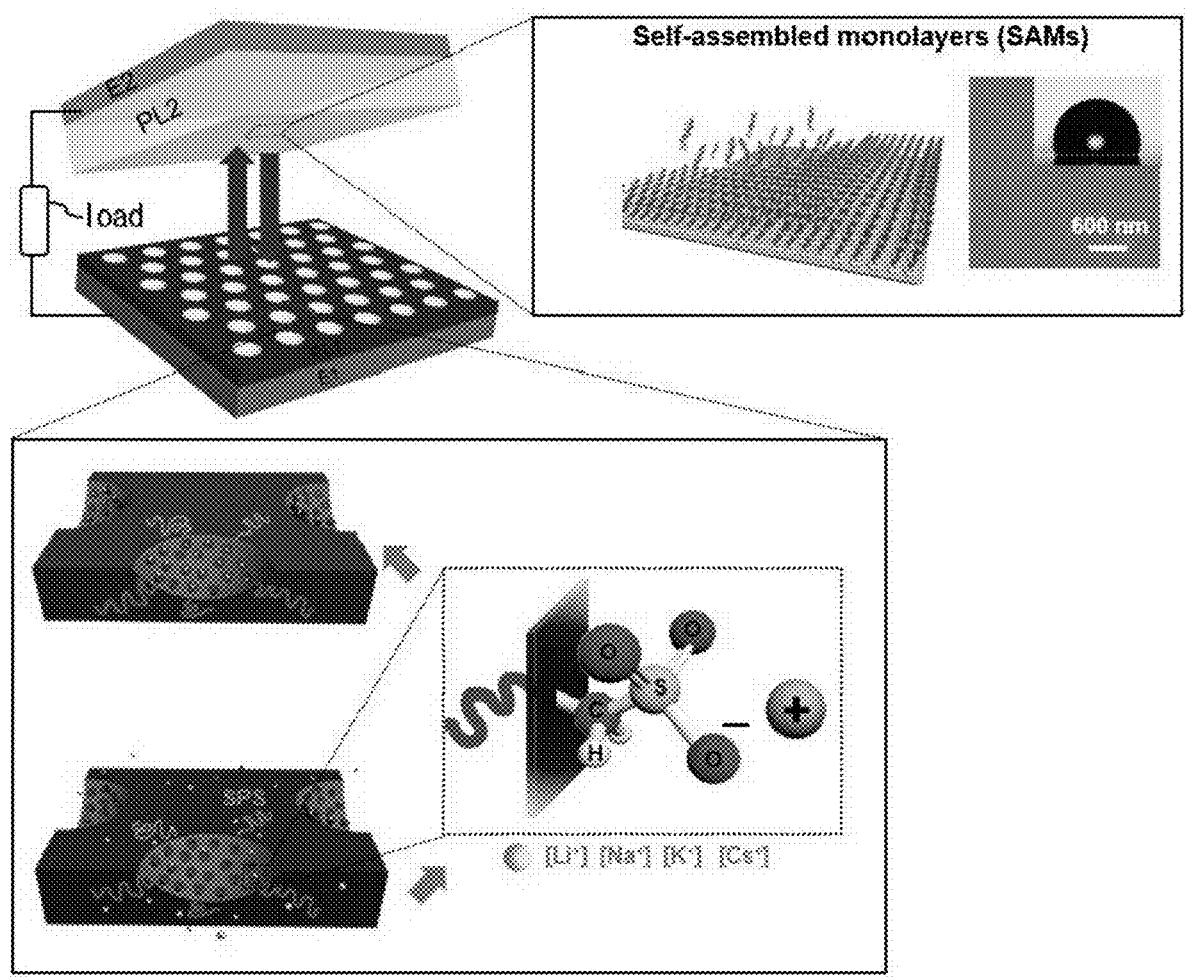

Referring to FIG. 9, the triboelectric generator of the vertical friction mode includes a first electrode (E1), a first nano-porous thin film (PL1), a second electrode (E2), and a second electrode (E2). The first nano-porous thin film (PL1) is in contact with the first electrode (E1) and fixed to the first electrode (E1), and the second thin film (PL2) is in contact with the second electrode (E2) and fixed to the electrode (E2). The first electrode (E1) and the second electrode (E2) are the same as the lower electrode (EL) described above, and the above description can be referred to. Also, the first nano-porous thin film (PL1) is the same as the nano-porous thin film (PL) described above, and the descriptions of the above-mentioned nano-porous thin film (PL) can be referred to.

In an embodiment of the present invention, the second thin film (PL2) may include a polymer layer and self-assembled monolayers (SAMs) formed on the polymer layer. The polymer layer may be made of a polymer containing oxygen such as polydimethylsiloxane (PDMS), polyethylene terephthalate, polyimide, or non-metallic materials such as silicon oxide, aluminum oxide.

The self-assembled monolayer (SAM) is an organic monolayer formed spontaneously on a solid surface. The SAM includes a head group bonded to the surface of the first nano-porous thin film (PL1), a terminal group (or a functional group) formed on the surface of the SAM and a hydrocarbon chain connecting the head group and the functional group. The self-assembled monolayers having various properties may be formed through various selection of the functional groups, and the magnitude of the triboelectric energy to be generated may be changed according to the functional group. The self-assembled monolayer (SAMs) may be any one of self-assembled monolayer of alkanoic acid, self-assembled monolayer of organic sulfur, and self-assembled monolayer of organic silicon.

The self-assembled monolayers (SAMs) may include the head group which is a silane group or a silanol group (Si $(OCH_3)_3$, Si $(OC_2H_5)_3$) bonding with oxygen of the first nano-porous thin film (PL1), the terminal group (ex. CH3, CF3, COOH, NH2) and hydrocarbons and/or fluorocarbons which are carbon chains connecting them. For example, self-assembled monolayers (SAMs) may be hydrocarbon-silanes containing silane groups. For example, self-assembled monolayers (SAMs) may be one of (3_Aminopropyl) triethoxysilane (APTES), n-Propyltriethoxysilane (PTES), (3,3,3-Trifluoropropyl) trimethoxysilane (FAS3), and (3-Mercaptopropyl) trimethoxysilane.

When external load is applied in the vertical direction (from top to bottom, or from bottom to top), the two different materials (ex. the first nano-porous thin film (PL1) and the second thin film (PL2)) that are spaced apart are rubbed and positive and negative charges may be generated on surfaces of the two different materials. When the external load is removed, the charged surfaces are spaced apart each other, thereby arising a potential difference between the first nano-porous thin film (PL1) and the second thin film (PL2). At this time, electrons between the first electrode (E1) and the second electrode (E2) move through an external circuit (or an electrical load), so that an output current may flow, in order to maintain an equilibrium of charges inside the device. Based on the above mechanism, it is possible to apply repeatedly the external load to produce continuous output current.

Figure 10A:
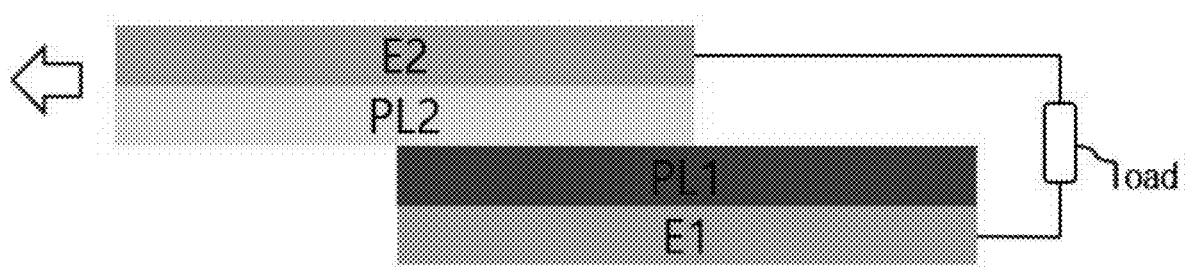
Figure 10B:
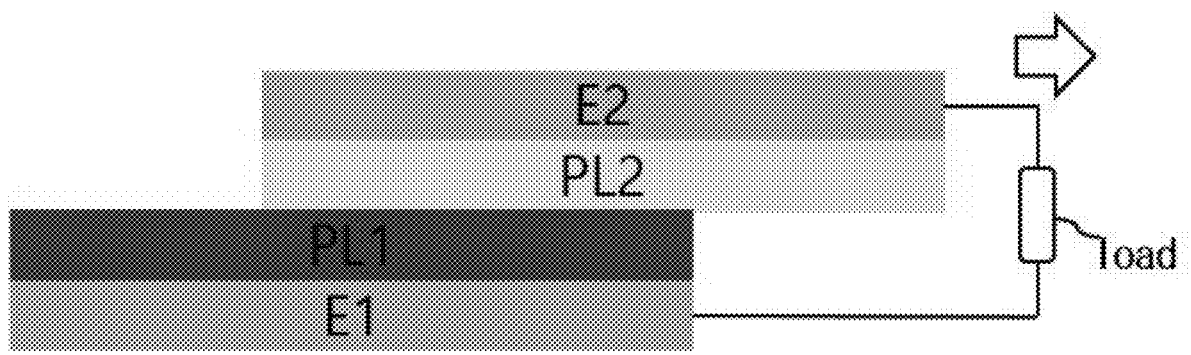

Referring to FIGS. 10A and 10B, the triboelectric generator of the sliding friction mode includes a first electrode (E1), a first nano-porous thin film (PL1) is in contact with the first electrode (E1) and fixed to the first electrode (E1), a second electrode (E2), and a second nano-porous thin film (PL2) is in contact with the second electrode (E2) and fixed to the second electrode (E2). The first electrode (E1) and the second electrode (E2) are the same as the lower electrode (EL) described above, and the above description of the lower electrode (EL) can be referred to. The first nano-porous thin film (PL1) is the same as the nano-porous thin film (PL) described above and can refer to the description of the nano-porous thin film (PL) described above and the second thin film (PL2) is the same as the above the description of the above-mentioned second nano-porous thin film (PL2), and the above description of the second thin film (PL2) can be referred to.

When an external load is applied in the horizontal direction, friction may occur through the contacting surface between the lower surface of the second thin film (PL2) and the upper surface of the first nano-porous thin film (PL1), and positive and negative charges may be generated. For example, a negative charge may be generated on the lower surface of the second thin film (PL2) and a positive charge may be generated on the upper surface of the first nano-porous thin film (PL1). Alternatively, a positive charge is generated on the lower surface of the second thin film (PL2) and a negative charge is generated on the upper surface of the first nano-porous thin film (PL1). At this time, in order to maintain an equilibrium of charges with respect to the positive charge generated in the surface of the second thin film (PL2) or the first nano-porous thin film (PL1), an output current may flow so that electrons move through an electrical load connecting between the first electrode (E1) and the second electrode (E2). The contact surface between the lower surface of the second thin film (PL2) and the upper surface of the first nano-porous thin film (PL1) is slid by the external load so that the electric signal may flow through an electrical load connecting between the first electrode (EL1) and the second electrode (EL2), and a direction of the electric signal may be periodically inverted, or the magnitude of the electric signal may periodically change.

Figure 11A:
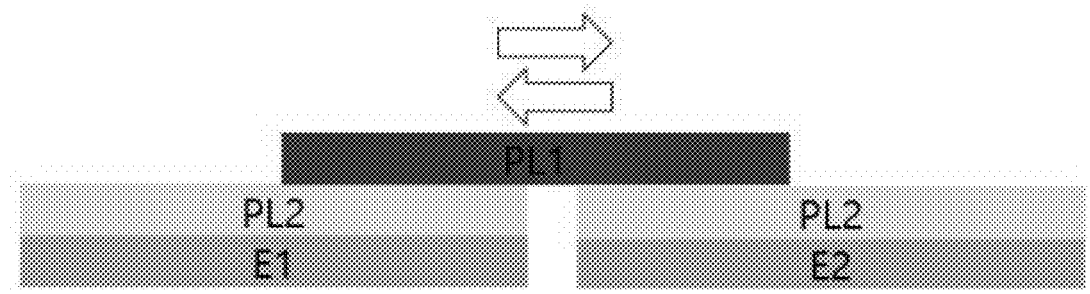

Referring to FIG. 11A, the frictional electric generator of the free-standing friction mode includes a first electrode (E1), second nano-porous thin films (PL2) fixed on the first electrode (E1) and the second electrode (E2), and a first nano-porous thin film (PL1) generating friction with at least one of the second thin film (PL2) of the first electrode (E1) and the second thin film (PL2) of the second electrode (E2). The first electrode (E1) and the second electrode (E2) may be spaced apart from each other and the second thin film (PL2) arranged on the first electrode (E1) and the another second nano-porous thin film (PL2) arranged on the second electrode (E2) may be arranged on the first electrode (E1) may be spaced apart from each other.

Figure 11B:
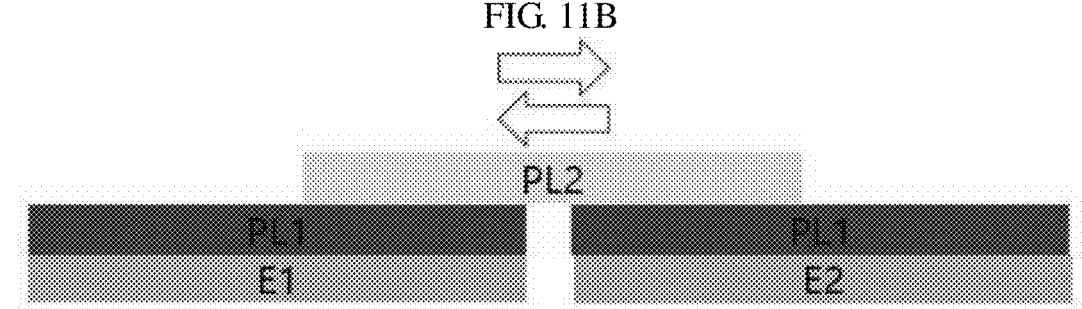

Referring to FIG. 11B, the frictional electricity generator of the free-standing friction mode includes a first electrode (E1), first nano-porous thin films (PL1) fixed on the first electrode (E1) and the second electrode (E2), and a second nano-porous thin film (PL2) generating friction with at least one of the first nano-porous thin film (PL1) of the first electrode (E1) and the first nano-porous thin film (PL1) of the second electrode (E2). The first electrode (E1) and the second electrode (E2) may be spaced apart from each other, and the first nano-porous thin film (PL1) arranged on the first electrode (E1) and the another first nano-porous thin film (PL1) arranged on the second electrode (E2) may be arranged on the first electrode (E1) may be spaced apart from each other.

Figure 11C:
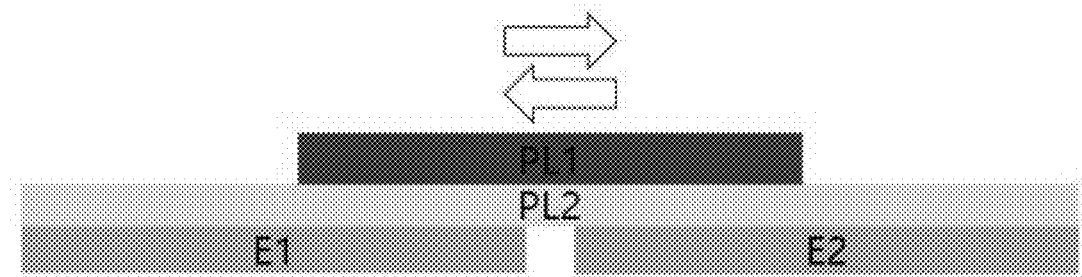

Referring to FIG. 11C, the frictional electric generator of the free-standing friction mode includes a first electrode (E1), a second electrode (E2), a second nano-porous thin films (PL2) fixed on the first electrode (E1) and the second electrode (E2), and a first nano-porous thin film (PL1) generating friction with the second thin film (PL2). The first electrode (E1) and the second electrode (E2) may be spaced apart from each other, and a separated distance between the first electrode (E1) and the second electrode (E2) may be covered by the second thin film s (PL2).

Figure 11D:
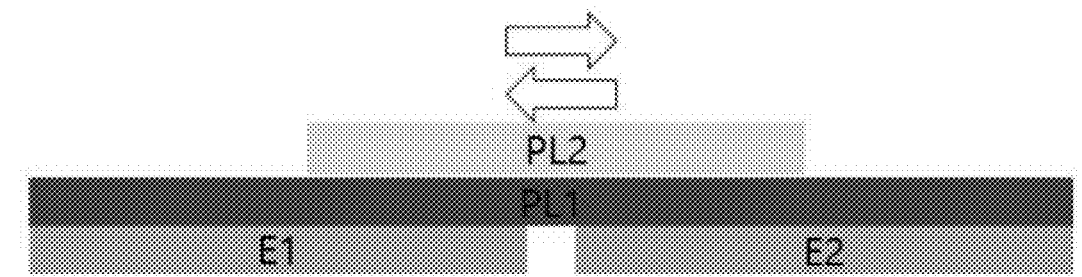

Referring to FIG. 11D, the frictional electric generator of the free-standing friction mode includes a first electrode (E1), a second electrode (E2), a first nano-porous thin films (PL1) fixed on the first electrode (E1) and the second electrode (E2), and a second nano-porous thin film (PL2) generating friction with the first nano-porous thin film (PL1). The first electrode (E1) and the second electrode (E2) may be spaced apart from each other, and a separated distance between the first electrode (E1) and the second electrode (E2) may be covered by the second thin film s (PL1).

In FIG. 11A to 11D, the first electrode (E1) and the second electrode (E2) are the same as the above-described lower electrode (EL), and the above description may be referred to. The first nano-porous thin film (PL1) is the same as the first nano-porous thin film (PL1) described above and the above description may be referred to. the second thin film (PL2) is the same as the second thin film (PL1) described above and the above description may be referred to.

As shown in FIG. 11A, the first nano-porous thin film (PL1) is slid on upper surfaces of two second nano-porous thin films (PL2) spaced apart from each other by a predetermined distance (d), or as shown in FIG. 11B, the porous thin film (PL2) is slid on upper surfaces of two second nano-porous thin films (PL2) spaced apart from each other by a predetermined distance (d) to generate positive and negative charges on the respective surfaces. At this time, in order to maintain an equilibrium of charges between two the first nano-porous thin films (PL1) or two the second thin film s (PL2), an output current may flow so that electrons move through an electrical load. In some embodiments, the first nano-porous thin film (PL1) or the second thin film (PL2) may generate a positive or negative charge on each surface without rubbing the surface, i.e., without contacting the surface.

The triboelectric nano-generator of the present invention described above may be easily combined with other power storage devices such as a rechargeable battery, an electric double layer capacitor (EDLC), a metal oxide pseudo capacitor or a supercapacitor, so that a hybrid power supply device may be provided. In addition, triboelectric nano-generators may be integrated directly with optoelectronic components to provide a variety of self-powered devices such as sensors, light emitting devices, transistors and non-volatile memory. In the present invention, a pair of suitable friction materials may be provided that can lead to mechanical stability and maximum output performance upon contact (or friction). Moreover, a chemically and/or topologically modified surface may be provided by electrostatic induction, so that performance of the triboelectric nano-generator can be improved. For example, an increase in the contact area with the fine patterned pyramid array and the nano-porous/nanowire thin film can improve the output performance more efficiently than the contact area with the thin film without pores. As in FIG. 9, described above, as ordered surfaces of organic molecules covalently bonded to various oxides and metal surfaces, such as self-assembled monolayers (SAM), and a variety of end-functional groups on the surface are provided, it is possible to provide a convenient method of controlling the performance of charge induction and charge transfer due to a change of chemical characteristics of the contact surface. In addition, the present invention may provide a triboelectric nano-generator having a reversibly responsive surface, thereby allowing easy control of triboelectric output performance in a single device. Because the performance of the triboelectric nano-generator is very sensitive to the nature of the contact surface, the development of a functional surface that reversibly changes in physical-chemical properties may be required for reversible and switchable triboelectric nano-generators. The metal ion can easily be exchanged in a nano-porous thin film containing metal ions formed on the surface, thereby fabricating a triboelectric sensitive switchable surface.

Supramolecular assembly of two terminal functionalized polymers is used as a useful platform where two terminal functional groups may interact electrostatically, resultingly the electrostatically linked polymers are self-assembled together and a nanostructured thin film similar to the structure to be generated by block copolymer self-assembly may be formed. A nano-porous structure may be formed in the supramolecular assembled nanostructure, through polymer assembly such as a graft copolymer electrostatically bonded to functional groups on the backbone of the second polymer. The nano-porous structures having surface functional groups may act as a critical component of reversible and reversible triboelectric nano-generators, when different type metal ions are reversibly switched using chemical bonds with chemical groups.

Figure 12A:
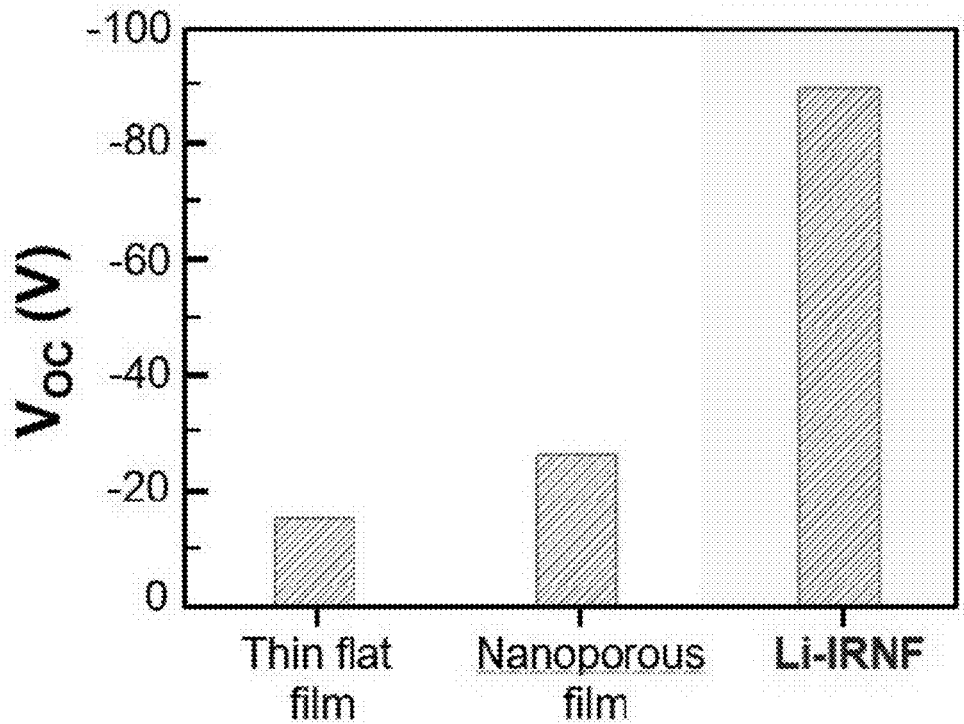
FIG. 12A is a graph comparing open circuit voltage values of a flat thin film, a nano-porous thin film not including ions, and a nano-porous thin film reacting with ions of the present invention.
Figure 12B:
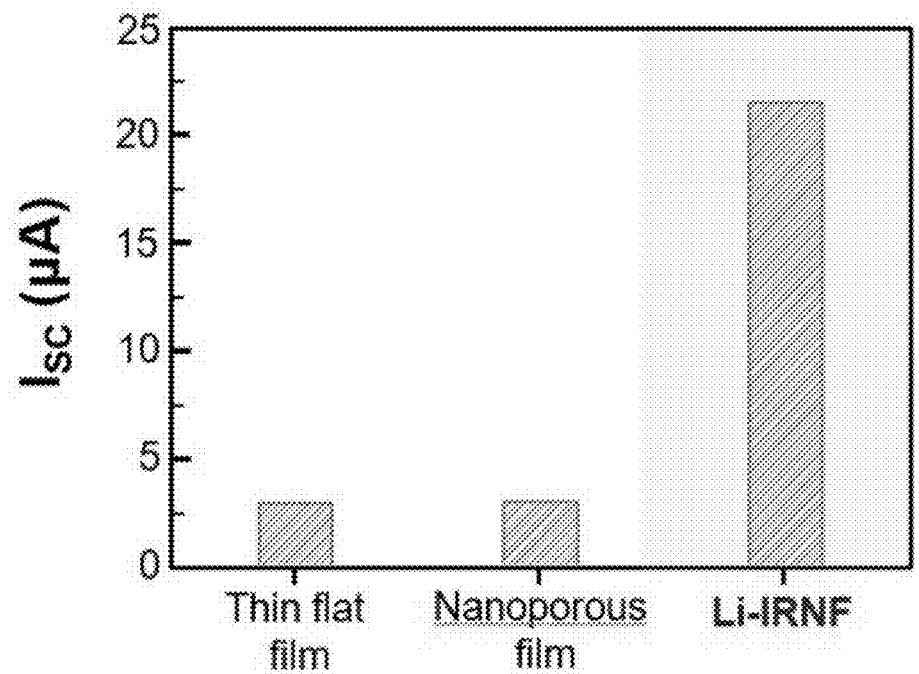
FIG. 12B is a graph comparing short circuit current values of a triboelectric generator using a nano-porous thin film not including ions, and a nano-porous thin film reacting with ions according to an embodiment of the present invention.

FIG. 12A is a graph comparing open circuit voltages of a triboelectric generator including a nano-porous thin film according to an embodiment of the present invention and a triboelectric generator including a thin film according to comparative examples 1 and 2, and FIG. 12B is a graph comparing short circuit currents of a triboelectric generator including a nano-porous thin film according to one embodiment of the present invention and a triboelectric generator including a thin film according to comparative examples 1 and 2. 'Li-IRNF' is a triboelectric generator including a nano-porous thin film containing lithium ions of the present invention, and comparative example 1 ('thin flat film') is a triboelectric generator including a thin film without porous pores and metal ions, and comparative example 2 ('Nano-porous film') is a triboelectric generator including a thin film having porous pores and not containing metal ions.

Referring to FIG. 12A, the open circuit voltage ($V_{OC}$) of the thin flat film of comparative example 1 is lower than the open circuit voltage ($V_{OC}$) of the nano-porous film of comparative example 2, the open circuit voltage ($V_{OC}$) of the nano-porous film of comparative example 2 is higher than the open circuit voltage ($V_{OC}$) of the thin flat film of comparative example 1, but the open circuit voltage ($V_{OC}$) of the nano-porous film of comparative example is lower than the open-circuit voltage ($V_{OC}$) of the triboelectric generator (Li-IRNF) of the present invention. That is, it may be seen that the open circuit voltage of the triboelectric generator using the nano-porous thin film of the present invention is higher than the open circuit voltage of the conventional triboelectric generators (comparative examples 1 and 2).

Referring to FIG. 12B, the short circuit current (Isc) of the tin flat film of comparative example 1 and the short circuit current (Isc) of the nano-porous film of comparative example 2 are substantially similar but are lower than the short circuit current (Isc) of the triboelectric generator (Li-IRNF) using the nano-porous thin film containing the lithium ion of the present invention. That is, it may be seen that the short circuit current (Isc) of the triboelectric generator using the nano-porous thin film of the present invention is higher than the short circuit current (Isc) of the conventional triboelectric generators (comparative examples 1 and 2).

Figure 13A:
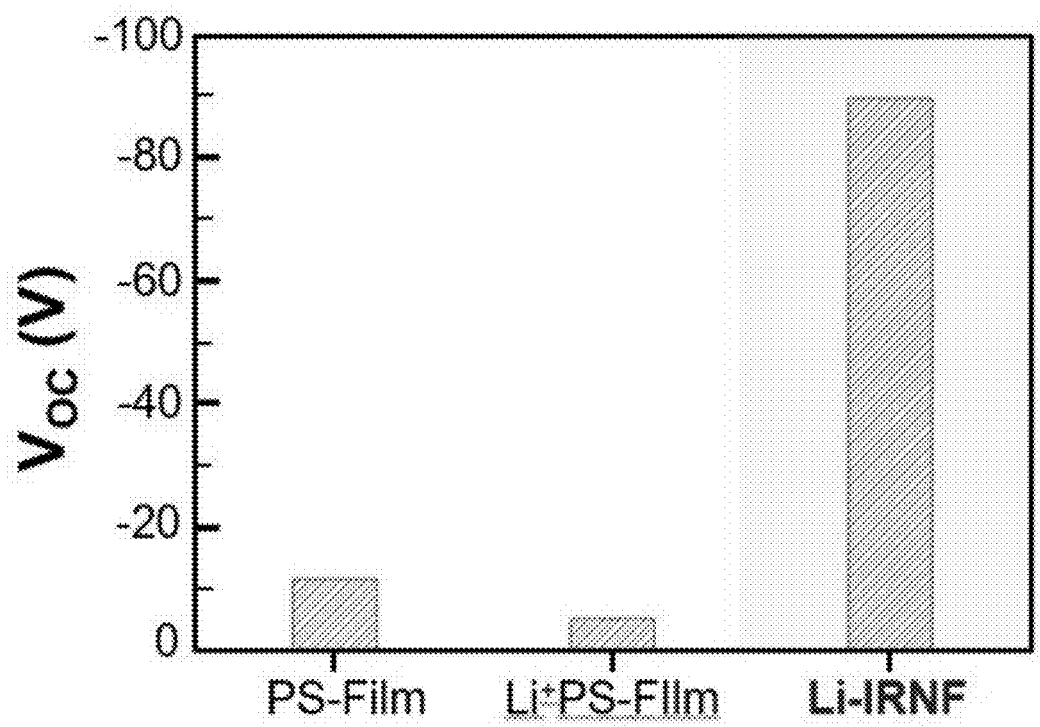
FIG. 13A is a graph comparing open circuit voltage values of a flat polystyrene thin film not including ions, a polystyrene thin film containing ions, and a nano-porous thin film reacting with ions of the present invention.
Figure 13B:
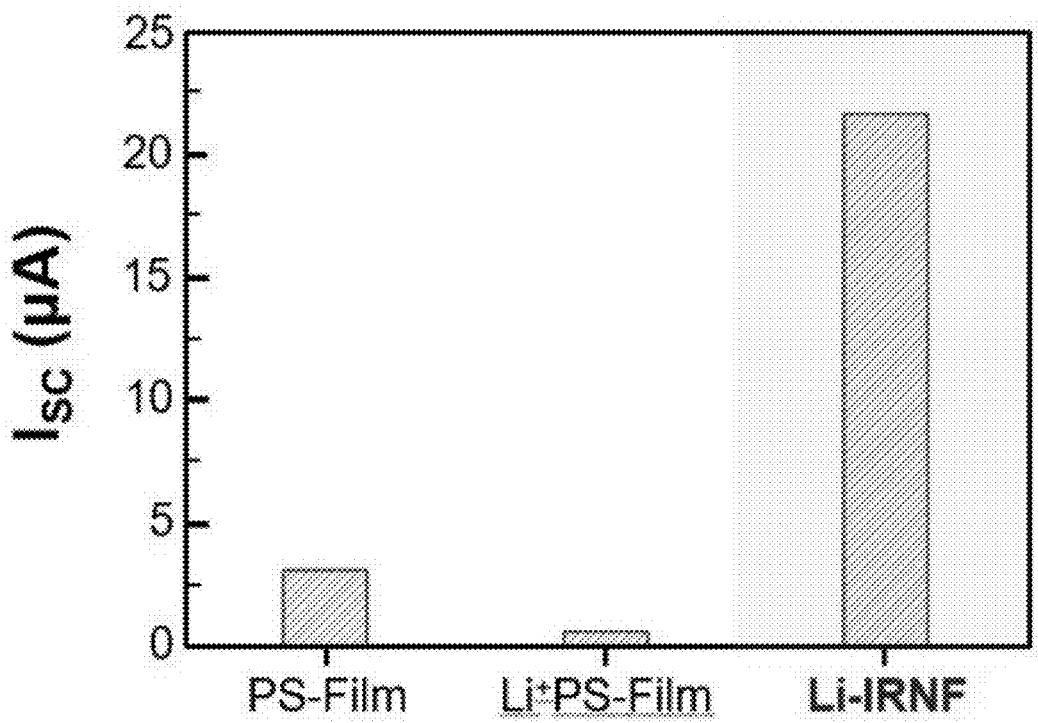
FIG. 13B is a graph comparing short circuit current values of a flat polystyrene thin film not including ions, a flat polystyrene thin film including ions, and a nano-porous thin film reacting with ions according to an embodiment of the present invention.

FIG. 13A is a graph comparing open circuit voltages ($V_{OC}$) of a triboelectric generator including a nano-porous thin film according to an embodiment of the present invention and a triboelectric generator including a thin film according to comparative examples 1 and 2, and FIG. 13B is a graph comparing short circuit currents (Isc) of a triboelectric generator including a nano-porous thin film according to one embodiment of the present invention and a triboelectric generator including a thin film according to comparative Examples 1 and 2. 'Li-IRNF' is a triboelectric generator including a nano-porous thin film containing lithium ions of the present invention, and comparative example 1 is a triboelectric generator including a polystyrene thin film containing no pores and ions PS-Film), and comparative example 2 is a triboelectric generator (Li+PS-Film) that does not contain pores and includes a thin film containing lithium ions.

Referring to FIG. 13A, the open circuit voltage ($V_{OC}$) of the triboelectric generator (PS-film) of comparative example 1 is higher than the open circuit voltage ($V_{OC}$) of the triboelectric generator (Li+PS-Film) but is lower the open circuit voltage ($V_{OC}$) of a triboelectric generator (Li-IRNF) using a nano-porous thin film containing lithium ions of the invention. That is, it may be seen that the open circuit voltage of the triboelectric generator (Li-IRNF) using the nano-porous thin film containing lithium ion of the present invention is higher than the open circuit voltage of the conventional triboelectric generator (comparative examples 1 and 2).

Referring to FIG. 13B, the short circuit current (Isc) of the triboelectric generator (PS-Film) of comparative example 1 is higher than the short circuit current (Isc) of the triboelectric generator (Li+PS-Film) of comparative example 2, but is lower than the short circuit current (Isc) of a triboelectric generator (Li-IRNF) using a nano-porous thin film containing lithium ions of the invention. That is, it may be seen that the short circuit current (Isc) of the triboelectric generator using the nano-porous thin film reacting with the ions of the present invention is higher than the short circuit current of the conventional triboelectric generator (comparative examples 1 and 2).

Figure 14A:
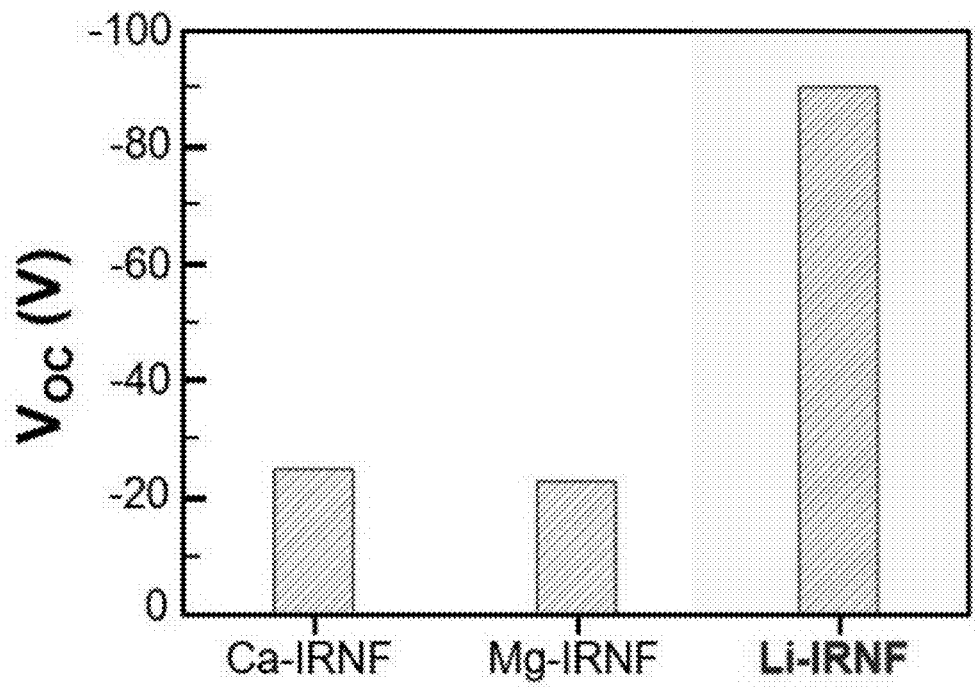
FIG. 14A is a graph comparing open circuit voltage values of a triboelectric generator using a nano-porous thin film that reacts with ions of different types according to an embodiment of the present invention.
Figure 14B:
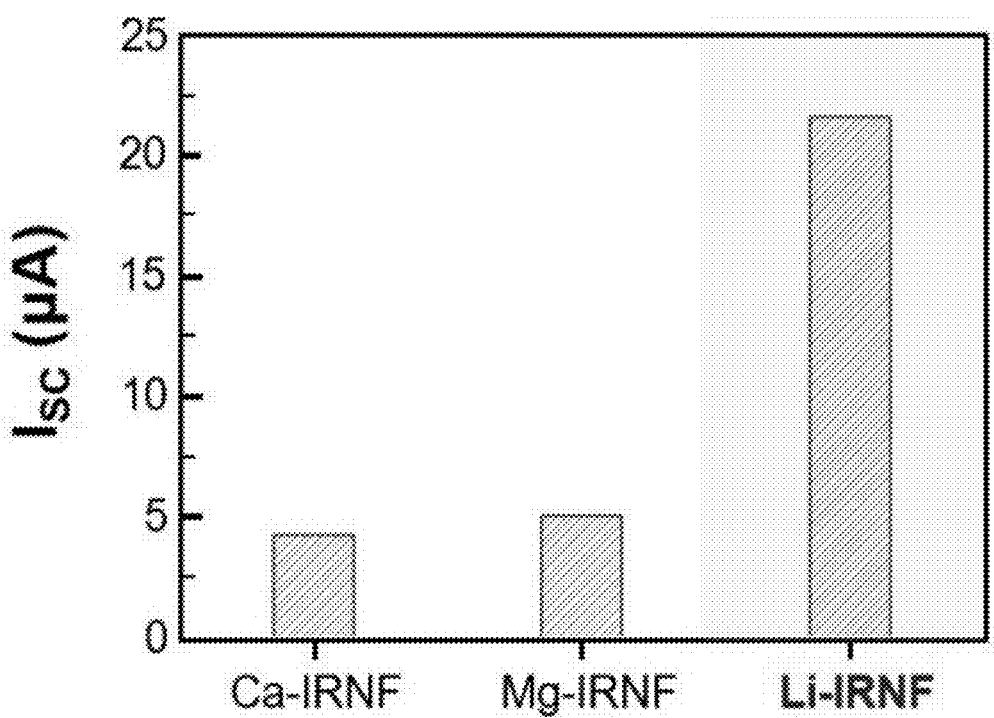
FIG. 14B is a graph comparing short circuit current values of a triboelectric generator using a nano-porous thin film that reacts with ions of different types according to an embodiment of the present invention.

FIG. 14A is a graph comparing the open circuit voltages ($V_{OC}$) of a triboelectric generator using a nano-porous thin film that reacts with ions of different kinds according to an embodiment of the present invention, and FIG. 14B is a graph comparing the short circuit current (Isc) of a triboelectric generator using a nano-porous thin film that reacts with ions of different kinds according to an embodiment of the present invention.

Referring to FIG. 14A, an open circuit voltage ($V_{OC}$) of a triboelectric generator (Ca-IRNF) using a nano-porous thin film that reacts with calcium ions ($Ca^{2+}$) is slightly higher than the open circuit voltage ($V_{OC}$) of the generator (Mg-IRNF) the triboelectricity of a nano-porous thin film which reacts with magnesium ions ($Mg^{2+}$), but is lower the open circuit voltage ($V_{OC}$) of a triboelectric generator (Li-IRNF) using a nano-porous thin film which reacts with lithium ions ($Li^+$). That is, the open circuit voltage of the triboelectric generator using the nano-porous thin film which reacts with an alkali metal ion such as lithium ion is higher than the open circuit voltage of the triboelectric generator using the nano-porous thin film which reacts with an alkaline earth metal ion such as calcium ion and magnesium ion.

Referring to FIG. 14B, a short circuit current (Isc) of the generator (Mg-IRNF) the triboelectricity of a nano-porous thin film which reacts with magnesium ions ($Mg^{2+}$) is slightly higher than a triboelectric generator (Ca-IRNF) using a nano-porous thin film that reacts with calcium ions ($Ca^{2+}$), but is lower the short circuit current (Isc) of a triboelectric generator (Li-IRNF) using a nano-porous thin film which reacts with lithium ions ($Li^+$). That is, the short circuit current (Isc) of the triboelectric generator using the nano-porous thin film which reacts with an alkali metal ion such as lithium ion is higher than the short circuit current (Isc) of the triboelectric generator using the nano-porous thin film which reacts with an alkaline earth metal ion such as calcium ion and magnesium ion.

As described above, according to an embodiment of the present invention, since alkali metal ions such as hydrogen ions (H$^+$), lithium ions (Li+), sodium ions (Na$^+$), potassium ions (K$^+$), rubidium ions (Rb$^+$), cesium ions (Cs$^+$) and franc ion (Fr$^+$), may easily combine with the sulfone group (SO$_3^-$), it may be confirmed that the output performance of the triboelectric generator is influenced by the alkali metal ions. In addition, the output power of the triboelectric generator using the nano-porous thin film chemically bonded to the alkali metal ions is within an output range of approximately 10 μW to 260 μW and an average open circuit voltage (V$_{OC}$) may be in the range of −100 V to −30 V, and the average short circuit current (I$_{sc}$) may be in the range of approximately 4 μA to 20 μA.

It may be seen in the present invention that a triboelectric generator using a nano-porous film of a size of 2×3 cm2 is mechanically robust without performance degradation under a repetitive frictional contact (e.g., 1.25 Hz, 5 N) over 50,000 times. Further, in the present invention, the surface characteristics of the nano-porous thin-film may be reversibly changed through the alkali metal ion exchange in the nano-porous structure.

As described above, in the present invention, based on the supramolecular-assembled polymer blending nanofilm coating technique, a porous nanostructure and a thin film having a functional group on the surface of the porous nanostructure are simultaneously formed, so that a nano generator element may be provided to generate electrical energy through friction with the self-assembled organic monolayer. It is possible to control the friction surface properties according to the degree of chemical bonding between the cation and the functional group existing on a surface of the structure by treating the alkali metal ion aqueous solution with supramolecularly assembled nano-porous thin film, and to control the energy performance generated by ion species under a certain pressure, by fabricating a triboelectric nano generator. In particular, the desired electrical characteristics may be achieved by reusing elements by using a reversible reaction of ion re-adsorption through separation of alkali metal ions through a hydration process and reprocessing of an aqueous solution. In addition, it may be applicable to various types of liquids containing mineral ions or salts and sensors or energy generator nano-device applications that separate specific ions from contaminated liquids containing cesium. In addition, a supramolecular self-assembled film on flexible substrates are fabricated to exhibit these characteristics in flexible devices, which can be applied to wearable devices that can effectively harvest energy from human motion.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, those of ordinary skill in the art will appreciate that the variable refractive indexes of the variable focus spectacle shown in FIG. 1 may change variously. In addition, it is to be understood that the lenses 100 and 110 according to the embodiments may be applied for various purposes in various fields other than a telescope, a microscope, and a headlamp of automobile. Therefore, the scope of the present invention is not to be determined by the described embodiments but should be determined by the technical idea described in the claims.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A nano-porous thin film comprising a supramolecular structure having a skeleton,
wherein a first compound block and a second compound block including a functional group is self-assembled to form a spherical micelle, the first compound block constitutes a core of the spherical micelle, and the second compound block constitutes a shell of the spherical micelle,
wherein the first compound block is removed from the spherical micelle while the second compound is remaining so that the remaining second compound provide the skeleton of the supramolecular structure,
wherein the supramolecular structure comprises pores formed therein, and metal ions selectively bonded to the functional group.

2. The nano-porous thin film of claim 1, wherein the metal ions are selectively bonded to the functional group of the supramolecular structure, mainly disposed on a surface of the nano-porous thin film.

3. The nano-porous thin film of claim 1, wherein the metal ions are ion-exchangeable with at least one other kind of ion.

4. The nano-porous thin film of claim 1, wherein the metal ions comprise one of a monovalent cation, a divalent cation, and a trivalent cation.

5. The nano-porous thin film of claim 4,
wherein the monovalent cation includes at least one metal ion selected from lithium ion (Li$^+$), sodium ion (Na$^+$), potassium ion (K$^+$), rubidium ion (Rb$^+$), cesium ion (Cs$^+$) and franc ion (Fr$^+$),
wherein the divalent cation includes one kind of metal ion including at least one metal ion selected from beryllium ion (Be$^{2+}$), magnesium ion (Mg$^{2+}$), calcium ion (Ca$^{2+}$), strontium ion (Sr$^{2+}$), barium ion (Ba$^{2+}$) and radium ion (Ra$^{2+}$),
wherein the trivalent cations include at least one metal ion including at least one metal ion selected from aluminum ions (Al$^{3+}$) and iron ions (III) (Fe$^{3+}$).

6. The nano-porous thin film of claim 1, wherein the functional group comprises an anionic functional group, the anionic functional group includes at least one of a sulfonate group, a sulfonic acid group, a phosphate group, a sulfate group and a hydroxyl group.

7. The nano-porous thin film of claim 1, wherein the first compound block includes at least one of poly-2-vinylpyridine (P2VP), pyrimidine, 2-methylpyrimidine, 4-methylpyrimidine, 5-methylpyrimidine, 4.6-dimethylpyrimidine, 4.6-dimethoxypyrimidine, 2-ethylpyrimidine, 4-ethylpyrimidine, 5-ethylpyrimidine, 4.6-diethylpyrimidine, 2-methoxypyrimidine, 4-methoxypyrimidine, 5-methoxypyrimidine, 2-ethoxypyrimidine, 4-ethoxypyrimidine, 5-ethoxypyrimidine, polyamic acid and polyolefin ketone.

8. The nano-porous thin film of claim 1, wherein the second compound block includes at least one of syndiotactic polystyrene, polystyrene, sulfuronite polystyrene and sulfuronite silsesquioxane.

9. The nano-porous thin film of claim 1, wherein a diameter of the supramolecular structure is controlled according to a concentration of the second compound block.

10. The nano-porous thin film of claim 1, wherein a diameter of the pores formed in the supramolecular structure is controlled according to a mixing ratio of the second compound block to the first compound block.

11. The nano-porous thin film of claim 1,
wherein the first compound block comprises a heterocyclic compound having a cyclic structure,
wherein the spherical micelle is formed through a hydrogen bond between an element in the heterocyclic compound having the cyclic structure of the first compound block and the functional group of the second compound block.

12. A method of fabricating of a nano-porous thin film comprising:
preparing a first compound block and a second compound block comprising a functional group;
mixing the first compound block and the second compound block to form a self-assembled spherical micelle in which the first compound block constitutes a core of the spherical micelle and the second compound block constitutes a shell of the spherical micelle;
forming a supramolecular structure having a skeleton formed by a residual second compound block, by removing the first compound block from the spherical micelle by applying an etching solvent to the spherical micelle; and
binding metal ions to pores formed in the supramolecular structure and the functional group, selectively.

13. The method of claim 12, wherein a solubility of the first compound block relative to the etching solvent is greater than that of the second compound block.

14. The method of claim 12, further comprising: ion-exchanging the metal ions bound to the functional group with at least one other kind of metal ion.

15. A triboelectric generator comprising:
a first electrode;
a second electrode is spaced apart from the first electrode and has a polarity which is different from a polarity of the first electrode; and
a nano-porous thin film between the first electrode and the second electrode,
wherein the nano-porous thin film comprising a supramolecular structure having a skeleton,
wherein a first compound block and a second compound block including a functional group is self-assembled to form a spherical micelle, the first compound block constitutes a core of the spherical micelle, and the second compound block constitutes a shell of the spherical micelle,
wherein the first compound block is removed from the spherical micelle while the second compound is remaining so that the remaining second compound provide the skeleton of the supramolecular structure,
wherein the supramolecular structure comprises pores formed therein, and metal ions selectively bonded to the functional group.

16. The triboelectric generator of claim 15, wherein the at least one of the first electrode, the second electrode and the nano-porous thin film operates in one of a vertical contact-separation mode, a sliding mode, a single-electrode mode and a freestanding triboelectric-layer mode.

17. A hybrid power supply system comprising:
a triboelectric generator comprising:
a first electrode;
a second electrode is spaced apart from the first electrode and has a polarity which is different from a polarity of the first electrode; and
a nano-porous thin film between the first electrode and the second electrode,
wherein the nano-porous thin film comprising a supramolecular structure having a skeleton,
wherein a first compound block and a second compound block including a functional group is self-assembled to form a spherical micelle, the first compound block constitutes a core of the spherical micelle, and the second compound block constitutes a shell of the spherical micelle,
wherein the first compound block is removed from the spherical micelle while the second compound is remaining so that the remaining second compound provide the skeleton of the supramolecular structure,
wherein the supramolecular structure comprises pores formed therein, and metal ions selectively bonded to the functional group;
a rechargeable energy storage unit coupled to the triboelectric generator; and
a power management module receiving an input current from the triboelectric generator and delivering an output current corresponding to the input current to the rechargeable energy storage so that the rechargeable energy storage is refilled.

* * * * *